US012002672B2

(12) United States Patent
Collings et al.

(10) Patent No.: US 12,002,672 B2
(45) Date of Patent: Jun. 4, 2024

(54) APPARATUS AND METHODS FOR REDUCED NEUTRAL CONTAMINATION IN A MASS SPECTROMETER

(71) Applicant: DH Technologies Development Pte. Ltd., Singapore (SG)

(72) Inventors: Bruce Collings, Bradford (CA); Pascal Martin, Woodbridge (CA)

(73) Assignee: DH Technologies Development Pte. Ltd., Singapore (SG)

( * ) Notice: Subject to any disclaimer, the term of this patent is extended or adjusted under 35 U.S.C. 154(b) by 0 days.

(21) Appl. No.: 16/630,007

(22) PCT Filed: Jun. 29, 2018

(86) PCT No.: PCT/IB2018/054874
§ 371 (c)(1),
(2) Date: Jan. 10, 2020

(87) PCT Pub. No.: WO2019/012367
PCT Pub. Date: Jan. 17, 2019

(65) Prior Publication Data

US 2021/0090870 A1 Mar. 25, 2021

Related U.S. Application Data

(60) Provisional application No. 62/531,180, filed on Jul. 11, 2017.

(51) Int. Cl.

*H01J 49/00* (2006.01)
*H01J 49/06* (2006.01)
*H01J 49/42* (2006.01)

(52) U.S. Cl.

CPC ........ *H01J 49/067* (2013.01); *H01J 49/0031* (2013.01); *H01J 49/4225* (2013.01); *H01J 49/426* (2013.01)

(58) Field of Classification Search

CPC .... H01J 49/067; H01J 49/0031; H01J 49/426; H01J 49/4225; H01J 49/00

(Continued)

(56) References Cited

U.S. PATENT DOCUMENTS 6,294,779 B1 * 9/2001 Apffel .................. H01J 49/145 250/288
7,932,488 B2 * 4/2011 Javahery .............. H01J 49/066 250/293

(Continued)

FOREIGN PATENT DOCUMENTS

WO 2010096904 A1 9/2010

OTHER PUBLICATIONS

Product bulletin "QJet (TM) Ion Guide Technology in the API 5000 (TM) LC/MS/MS System" (produced by Applied Biosystems and MDS Analytical technologies, 114PB12-02, Published Jun. 2008).*

(Continued)

*Primary Examiner* — Jason L McCormack

(57) ABSTRACT

Apparatus and methods for controlling contamination of components contained within the high-vacuum chambers of mass spectrometer systems are provided. The apparatus and methods employ a beam of neutral gas injected in a contra-flow configuration to incoming particle stream from the ionization chamber. The contra-flow can be in the directly opposite counter-flow direction (e.g., 180 degrees) or at a cross-flow angle to the incoming ion stream (e.g., flowing at an angle between about 10 degrees and 170 degrees). The contra-flow disrupts the axial gas flow and diverts neutral molecules and other undesirable contaminants before they reach the high vacuum stages (e.g., beyond the IQ0 orifice) of the spectrometer. By reducing the transmission of contaminants into the sensitive components housed deep within the mass spectrometer, the present invention can increase throughput, improve robustness, and/or decrease the down- (Continued)

time typically required to vent/disassemble/clean the fouled components.

23 Claims, 19 Drawing Sheets

(58) Field of Classification Search
USPC .......................................... 250/281, 282, 288
See application file for complete search history.

(56) References Cited

U.S. PATENT DOCUMENTS

| | | | | |
|---|---|---|---|---|
| 9,899,196 | B1 * | 2/2018 | Cody | H01J 49/0031 |
| 2005/0173629 | A1 * | 8/2005 | Miller | G01N 27/624 250/290 |
| 2012/0228490 | A1 | 9/2012 | Wu et al. | |
| 2014/0117221 | A1 | 5/2014 | Schneider et al. | |
| 2014/0197333 | A1 * | 7/2014 | Jolliffe | H01J 49/044 250/423 P |
| 2015/0097114 | A1 * | 4/2015 | Green | H01J 49/162 250/288 |
| 2015/0108347 | A1 * | 4/2015 | Vidal de Miguel | G01N 27/622 250/288 |
| 2017/0122908 | A1 | 5/2017 | Covey et al. | |

OTHER PUBLICATIONS

Hanson et al. ("Ambient Pressure Proton Transfer Mass Spectrometry: Detection of Amines and Ammonia" Environmental Science & Technology, 2011, 45, 8881-8888, published Sep. 6, 2011). (Year: 2011).*

International Search Report and Written Opinion for PCT/IB2018/054874 dated Oct. 31, 2018.

* cited by examiner

ICG OFF

ICG = 0.019 slpm (sep 9/16), 38.8 hours

ICG ON

ICG = 0.257 slpm (oct 3/16), 37.3 hours

ICG OFF

IQ1, Jul 29/16, ICG = 0.008 slpm, linear
Q0 (2-seg), 1/1000 olive oil, 93.6 hours

ICG ON

IQ1, Oct 18/16, ICG = 0.255 slpm, linear
Q0 (2-seg), 1/1000 olive oil, 83.9 hours

APPARATUS AND METHODS FOR REDUCED NEUTRAL CONTAMINATION IN A MASS SPECTROMETER

RELATED APPLICATION

This application claims priority to U.S. provisional application No. 62/531,180 filed on Jul. 11, 2017, entitled "Apparatus and Methods for Reduced Neutral Contamination in a Mass Spectrometer," which is incorporated herein by reference in its entirety.

FIELD

The technical field of this invention is mass spectrometry and, more particularly, the invention relates to apparatus and methods for controlling and/or reducing contamination in the high vacuum portions of a mass spectrometer.

INTRODUCTION

Mass spectrometry (MS) is an analytical technique for determining the elemental composition of test substances with both quantitative and qualitative applications. For example, MS can be used to identify compounds present in a sample and to quantify the relative amount of a particular compound in the sample. It can also determine the structure of a particular compound by observing its fragmentation as well as the isotopic composition of elements in a molecule.

In mass spectrometry, sample molecules are generally converted into ions using an ion source and then separated and detected by one or more mass analyzers. For most atmospheric pressure ion sources, ions pass through an inlet orifice and enter an ion guide disposed in an initial stage of a vacuum chamber. In conventional mass spectrometer systems, a radio frequency (RF) signal applied to the ion guide provides collisional cooling and radial focusing along the central axis of the ion guide as the ions are transported into a subsequent, lower-pressure vacuum chamber in which the mass analyzer(s) are disposed.

Ionization at atmospheric pressure (e.g., by chemical ionization, electrospray) is generally a highly efficient means of ionizing molecules within the sample. However, the process that generates ions of analytes of interest also generates interfering/contaminating ions as well as residual or recombinant neutral molecules. Though increasing the size of the inlet orifice between the ion source and the ion guide may increase the number of ions of interest entering the ion guide (thereby potentially increasing the sensitivity of MS instruments), such a configuration can likewise allow more unwanted molecules to enter the vacuum chamber and be drawn into downstream mass analyzer stages located deep within the high-vacuum chamber.

Transmission of undesired ions and neutral molecules can foul/contaminate these downstream elements, thereby interfering with mass spectrometric analysis and/or leading to increased costs and/or decreased throughput necessitated by the cleaning of critical components within the high-vacuum chamber(s). Additionally, some ion sources (e.g., electrospray sources for generating ions throughout a liquid chromatography elution gradient) can continuously generate ions that enter the mass analyzer even during the time periods when no data is collected or no analyte of interest would be present, further accelerating the contamination of the mass analyzer. Because of the higher sample loads and contaminating nature of biologically-based samples being analyzed with current day atmospheric pressure ionization sources, maintaining a clean mass analyzer remains a critical concern.

Because most ion optics (e.g., lenses) of mass spectrometry systems are inherently subject to ions and neutrals deposition and therefore exhibit significantly different behavior following substantial contamination (e.g., loss of sensitivity), fouled surfaces must be regularly cleaned to maintain sensitivity. While the surfaces of front-end components (e.g., curtain plates, orifice plates, QJet, IQ0) may be relatively accessible and easy to clean, the fouling of components contained within the downstream high-vacuum chambers (e.g., Q0, Q1, IQ1) can result in substantial time and/or expense as the vacuum chambers must be vented and substantially disassembled prior to cleaning.

Accordingly, there remains a need for improved methods and systems for reducing contamination in mass spectrometers and, in particular, in downstream mass analyzers.

SUMMARY

Apparatus and methods for controlling contamination of components contained within the high-vacuum chambers of mass spectrometer systems are provided. The apparatus and methods employ a beam of neutral gas injected in a contra-flow configuration to incoming particle stream from the ionization chamber. The contra-flow can be directly counter-flow in the opposite direction (e.g., 180 degrees) or at a cross-flow angle to the incoming ion stream (e.g., flowing across the ions travelling through the ion guide). The contra-flow disrupts the axial gas flow and diverts neutral molecules and other undesirable contaminants before they reach the high vacuum stages (e.g., beyond the IQ0 orifice) of the spectrometer. By reducing the transmission of contaminants into the sensitive components housed deep within the mass spectrometer, the present teachings can increase throughput, improve robustness, and/or decrease the downtime typically required to vent/disassemble/clean the fouled components.

In accordance with various aspects of the present teachings, a mass spectrometer system is provided that comprises an ion source housing defining an ionization chamber, the ionization chamber comprising a curtain plate defining a curtain plate aperture through which ions generated in the ionization chamber can be transmitted to one or more downstream mass analyzers. An orifice plate defining a sampling orifice is separated from the curtain plate so as to define a curtain chamber therebetween through which ions from the curtain plate aperture can be transmitted to the sampling orifice. The system also includes a power supply electrically coupled to the curtain plate and the orifice plate for providing electrical signals thereto and a controller operatively coupled to the power supply.

The system can further comprise a curtain gas supply for flowing curtain gas into the curtain chamber, wherein at least a portion of the curtain gas is directed through the curtain plate aperture to the ionization chamber. Additionally, or alternatively, a counter-current flow of curtain gas (typically nitrogen) can be provided in at least a portion of the curtain chamber. Ions can be propelled through the counter-current gas flow by the electrostatic field generated between the curtain and orifice plates.

In one aspect of the invention, internal curtain gas (ICG) can also be provided in a contra-flow configuration to an initial ion guide segment between the curtain chamber and the orifice to the high vacuum segments of the spectrometer, e.g., at QJet or between QJet and Q0, as described in more detail below. The contra-flow can be in a parallel but opposite (i.e., 180 degree counter flow) direction to the ion beam that is being formed in the ion guide or at any other cross-flow direction. Thus the angle of contra-flow can range from about 10 degrees to about 180 degrees. Without enumerating every angle, it will be appreciated that the invention encompasses every angle between 10 and 180 degrees and all such angles are claimed. The only requirement is that the gas jet diverts neutral molecules in the gas jet from the sampling orifice away from the downstream aperture at the IQ0 ion optic. In the cross-flow configuration, the ICG is preferably provided by a nozzle disposed adjacent to the ion guide at a distance from the IQ0 aperture. The nozzle can be situated at an angle, e.g., from 10 degrees to 170 degrees relative to the ions flowing through the ion guide. The preferred angle will depend upon various factors, such as the length of the QJet, the diameter of the nozzle and how close the nozzle is situated to the QJet electrodes. If a 180 degree (directly counter-flow) configuration is desired, it can preferably be implemented by two plates situated around the IQ0 aperture with the ICG flowing between the plate directly counter to the ion flow in the guide.

In accordance with various aspects, the system also comprises an ion source for receiving a fluid sample and for continuously discharging said fluid sample into said ionization chamber, the power supply being electrically coupled to the ion source so as to provide an ion source voltage to the ion source for generating ions as the fluid sample is discharged into the ionization chamber In accordance with various aspects of the present teachings, a method for controlling contamination in a mass spectrometer system is provided, the method comprising generating one or more ionized species within an ionization chamber, said ionization chamber comprising a curtain plate defining a curtain plate aperture through which ions generated in the ionization chamber can be transmitted. The exemplary method can further comprise providing an electric field within a curtain chamber between the curtain plate and an orifice plate disposed downstream from the curtain plate.

The ion source can receive the fluid sample from a variety of sources. By way example, in some aspects, the method can receive the fluid sample from a liquid chromatography column.

In certain embodiments, the internal curtain gas is introduced at a pressure greater than about 1 Torr, or at a pressure greater than about 5 Torr, or at a pressure greater than about 30 Torr. In cross-flow configurations, the ICG can be introduced by a nozzle (PEEK tube) having a very small internal diameter, e.g., less than or equal to 0.508 mm, less than or equal to 0.254 mm, or even less than or equal to 0.178 mm. Depending on the diameter of the nozzle, the backing pressure should be adjusted to maintain a desired flow rate. The density of the gas is chosen to ensure sufficient interaction with the gas jet from the sampling orifice. There has to be sufficient collisions to divert the beam. If the density is too low then the gas jet from the sampling orifice will not be diverted.

Preferably, in certain embodiments, the configuration of the ion guide channel inlet aperture and the pressure difference between the ionization chamber and ion guide chamber provides a supersonic free jet expansion downstream of the inlet aperture, the supersonic free jet expansion comprising a barrel shock of predetermined diameter; and wherein the cross-section of the ion guide channel is sized to be at least 50% of the predetermined diameter of the barrel shock of the supersonic free jet expansion.

In another aspect of the invention, methods are disclosed for limiting contamination in a mass spectrometer system, by generating one or more ionized species from a sample within an ionization chamber, directing ions generated in the ionization chamber through an ion guide channel to one or more downstream mass analyzers, the ion guide channel comprising an inlet aperture in communication with said ionization chamber and an exit aperture for passing ions to said downstream mass analyzers; and introducing an internal curtain gas into the ion guide channel, such that the internal curtain gas flow facilitates removal of neutral molecules/particles.

The method can further include configuring the internal curtain gas inlet and ion guide channel such that the internal curtain gas is directed in a contra-flow direction to ions passing through the ion guide channel and into a diversion port for evacuating the internal curtain gas and neutral molecules entrained therewith. For example, the internal curtain gas can be introduced in a cross-flow direction from about 10 to about 170 degrees with respect to the quadrupole axis. The internal curtain gas nozzle is configured to deflect the gas jet from the orifice away from the aperture in the lens IQ0. The minimum and maximum angles will depend upon the length of the QJet, diameter of the nozzle tube and how close the tube is to the QJet electrodes. Alternatively, the contra-flow can be in a direction substantially parallel but opposite to the direction of ions passing through the ion guide channel. In this direct counter-flow configuration, the internal curtain gas can be introduced via a ring nozzle concentric with and surrounding the aperture in the IQ0 lens.

In order to deflect the gas jet originating from the sampling orifice the pressure at the exit of the crossed jet capillary has to be sufficiently high. The pressure has to be high enough so that there are sufficient collisions between the gas molecules to transfer enough momentum to change the direction of the molecules/particles in the gas jet from the sampling orifice. Computational fluid dynamics (CFD) can be used to simulate and visualize the flows under different conditions. The conditions of the experiments are used as a starting point. It should be noted that if the flow rate from the crossed gas jet is too low, then, insufficient collisions will occur to divert the gas jet from the sampling orifice. Experimental evidence indicates that a flow of 0.1 standard liter per minute (slpm) is just enough to fully deflect the gas jet from the sampling orifice while flows <0.1 slpm only partially deflect the gas jet from the sampling orifice. Larger diameter sampling orifices may require higher minimum gas flows from the crossed jet capillary.

For cross-flow configurations, the pressure at the exit of the nozzle or capillary can be calculated knowing the flow rate of the gas through the capillary and the dimensions of the capillary at its exit. For example, a flow rate (Q) of 0.14 slpm nitrogen deflects the gas jet from the sampling orifice enough to reduce the impact pressure at the IQ0 lens. This is shown by the minimum in the Q0 pressure in FIG. 6. The pressure at the exit of the capillary, $P_{exit}$, can be calculated using the equation, Q=PC which can be re-arranged to give P=Q/C where C (units of L/s) is the conductance at the exit of the capillary. We are operating in the laminar flow regime so C can be calculated using the equation:

$$C = 20\frac{A}{1-\delta} \tag{1}$$

where $\delta = P_2 / P_1$

In this case $P_2$=2.5 Torr and $P_1$=43.7 Torr giving d=0.057. The value for $P_1$ was obtained from a first use of the equation for C with d set to zero.

The area at the exit of the capillary is calculated using $A=\pi r^2$ where r is the radius of the of the capillary opening (0.0254 cm) and A is the area in $cm^2$ (2.03e−3 $cm^2$).

The conductance, C, is then calculated to be 0.0431 l/s or 2.586 l/min. The pressure at the exit of the capillary can now be calculated using $P_{exit}$=Q/C=0.14 l/min*760 Torr/2.586 l/min=41.1 Torr.

According to the equation Q=PC, using a smaller diameter capillary requires that the pressure at the exit of the capillary be increased in order to maintain the same flow rate or Q. For example, decreasing the capillary to half the internal diameter requires that P be increased by a factor of four to maintain the same flow rate, i.e.

$$Q=5\pi D^2 P_{exit} \quad (2)$$

This will allow the density of molecules as a function of distance from the capillary exit to remain approximately the same. The density or pressure as a function of distance can be calculated using equation 3. (H. Ashkenas and F. S. Sherman, Rarefied Gas Dynamics, p. 87, Vol. II, 1966, edited by J. H. de Leeuw, Academic Press, New York.)

$$\frac{P_i}{P_0} = \left(\frac{\gamma+1}{\gamma-1}\right)^{\frac{\gamma}{\gamma-1}} \left(\frac{\gamma+1}{2\gamma}\right)^{\frac{1}{\gamma-1}} A^{-\frac{2}{\gamma-1}} \left(\frac{x-x_0'}{D}\right)^{-2} \quad (3)$$

Where γ is the ratio of the heat capacities for constant volume and constant pressure for nitrogen, A is a constant and x is the distance from the source, $x_0$. Equation 3 can be re-arranged to give:

$$P_i = K(x-x_0)^{-2} D^2 P_0 \quad (4)$$

$$\text{where } K = \left(\frac{\gamma+1}{\gamma-1}\right)^{\frac{\gamma}{\gamma-1}} \left(\frac{\gamma+1}{2\gamma}\right)^{\frac{1}{\gamma-1}} A^{-\frac{2}{\gamma-1}}$$

Equation 4 shows that the pressure some distance from the exit of the capillary will be a function of $D^2P_0$ which is the same dependency as for Q demonstrating that it is the flow rate, Q, that needs to be maintained when different internal diameter capillaries are employed.

What then limits the maximum internal diameter of the capillary is the physical spacing between the rods where the gas is directed. The smallest internal diameter will be limited by the conductance of the gas delivery system and the pressure required to maintain the required flow rate.

In certain embodiments, the pressure difference between the ionization chamber and ion guide chamber can provide a supersonic free jet expansion downstream of the inlet aperture, the supersonic free jet expansion comprising a barrel shock of predetermined diameter; and wherein the cross-section of the ion guide channel is sized to be at least 50% of the predetermined diameter of the barrel shock of the supersonic free jet expansion.

In certain embodiments, the internal curtain gas can be introduced into the ion guide channel at a volumetric flow rate of at least 0.05 standard liter per minute (slpm) such that the internal curtain gas flow is effective to prevent at least a portion of unwanted molecules within the sample from transiting to the ion guide channel exit aperture. In certain applications it may also be desirable to introduce the internal curtain gas at a volumetric flow rate less than 1.0 slpm, or less than about 0.5 slpm, or less than about 0.25 slpm or less than 0.1 slpm to avoid undue disruption of ion flow. The internal curtain gas supply can be controlled by a controller adapted to adjust the volumetric flow rate of curtain gas.

Further understanding of various aspects of the present teachings can be obtained by reference to the following detailed description and the associated drawings, which are discussed briefly below.

BRIEF DESCRIPTION OF DRAWINGS

The foregoing and other objects and advantages of the invention will be appreciated more fully from the following further description, with reference to the accompanying drawings. The skilled person in the art will understand that the drawings, described below, are for illustration purposes only. The drawings are not intended to limit the scope of the applicant's teachings in any way.

FIG. 10A is a graph of the normalized signal intensity as a function of gas flow rate for the orthogonal gas jet configuration while

FIG. 15A is a graph of ion intensity in an olive oil mass spectrum with an orthogonal ICG counter-flow configuration while FIG. 15B is a similar graph with 180 degree ICG counter-flow configuration demonstrating that ICG can completely block ions from passing the IQ0 lens.

DETAILED DESCRIPTION

Figure 1:
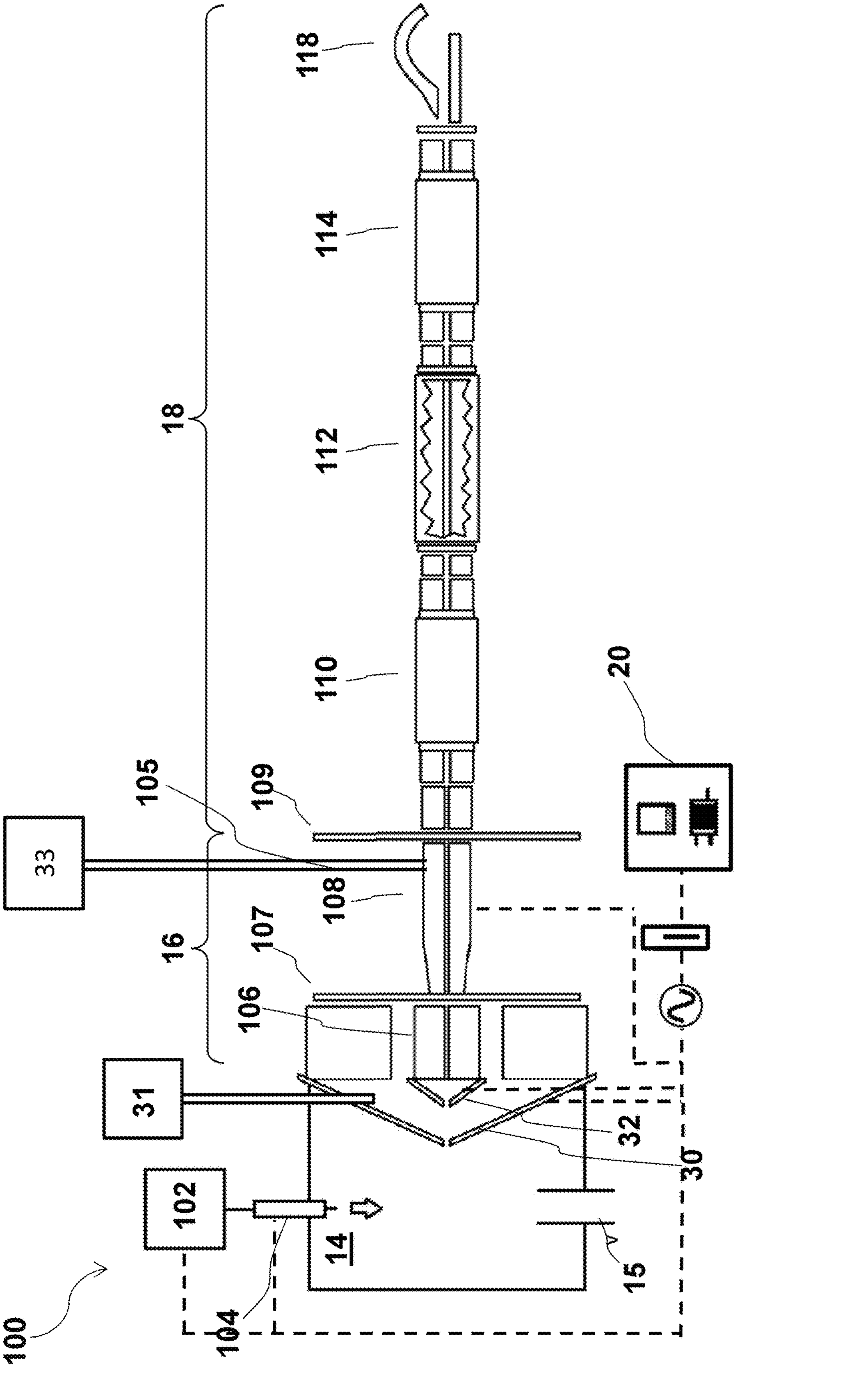
FIG. 1 schematically depicts a mass spectrometer system in accordance with the invention.

It will be appreciated that for clarity, the following discussion will explicate various aspects of embodiments of the applicant's teachings, while omitting certain specific details wherever convenient or appropriate to do so. For example, discussion of like or analogous features in alternative embodiments may be somewhat abbreviated. Well-known ideas or concepts may also for brevity not be discussed in any great detail. The skilled person will recognize that some embodiments of the applicant's teachings may not require certain of the specifically described details in every implementation, which are set forth herein only to provide a thorough understanding of the embodiments. Similarly it will be apparent that the described embodiments may be susceptible to alteration or variation according to common general knowledge without departing from the scope of the disclosure. The following detailed description of embodiments is not to be regarded as limiting the scope of the applicant's teachings in any manner.

The term "about" and "substantially" as used herein, refers to variations in a numerical quantity that can occur, for example, through measuring or handling procedures in the real world; through inadvertent error in these procedures; through differences/faults in the manufacture of electrical elements; through electrical losses; as well as variations that would be recognized by one skilled in the art as being equivalent so long as such variations do not encompass known values practiced by the prior art. Typically, the term "about" means greater or lesser than the value or range of values stated by 1/10 of the stated value, e.g., ±10%. For instance, applying a voltage of about +3V DC to an element can mean a voltage between +2.7V DC and +3.3V DC. Likewise, wherein values are said to be "substantially identical," the values may differ by up to 5%. Whether or not modified by the term "about" or "substantially" identical, quantitative values recited in the claims include equivalents to the recited values, e.g., variations in the numerical quantity of such values that can occur, but would be recognized to be equivalents by a person skilled in the art.

Methods and systems for preventing contamination of components within the high-vacuum chambers of mass spectrometer systems are provided herein. Because substantial fouling of components contained within the downstream high-vacuum chambers (e.g., Q1, IQ1) can have significant effects on the effective operation of a mass spectrometer system (e.g., loss of sensitivity, increased noise), reducing the ion transmission during non-analytical periods of an experiment in accordance with various aspects of the present teachings can result in a significant reduction in contamination of the downstream elements, and thus, increase throughput, improve robustness, and/or decrease the downtime typically required to service (e.g., vent, disassemble and clean) mass spectrometer systems.

The term "contra-flow" is used herein to denote a direction other than the path of ions through the ion guide channel. In certain embodiments, the contra-flow can be in a parallel but opposite direction to the ion beam that is being formed in the ion guide (direct counter-flow) or it can be at an angle relative to the ion guide axis (cross-flow). Without enumerating every angle, it will be appreciated that the invention encompasses every angle between about 10 degrees and 180 degrees and all such angles are claimed.

While the systems, devices, and methods described herein can be used in conjunction with many different mass spectrometer systems, an exemplary mass spectrometer system 100 for such use is illustrated schematically in FIG. 1. It should be understood that the mass spectrometer system 100 represents only one possible mass spectrometer instrument for use in accordance with embodiments of the systems, devices, and methods described herein, and mass spectrometers having other configurations can all be used in accordance with the systems, devices and methods described herein as well.

As shown schematically in the exemplary embodiment depicted in FIG. 1, the mass spectrometer system 100 generally comprises a triple quadrupole (QqQ) mass spectrometer, modified in accordance with various aspects of the present teachings. Other non-limiting, exemplary mass spectrometer systems that can be modified in accordance with various aspects of the systems, devices, and methods disclosed herein can be found, for example, in an article entitled "Product ion scanning using a Q-q-$Q_{linear\ ion\ trap}$ (Q TRAP®) mass spectrometer," authored by James W. Hager and J. C. Yves Le Blanc and published in Rapid Communications in Mass Spectrometry (2003; 17: 1056-1064), and U.S. Pat. No. 7,923,681, entitled "Collision Cell for Mass Spectrometer," which are hereby incorporated by reference in their entireties. Other configurations, including but not limited to those described herein and others known to those skilled in the art, can also be utilized in conjunction with the systems, devices, and methods disclosed herein. For instance other suitable mass spectrometers include single quadrupole, triple quadrupole, ToF, trap, and hybrid analyzers.

As shown in FIG. 1, the exemplary mass spectrometer system 100 comprises an ion source 104 for generating ions within an ionization chamber 14, an ion guide section 16 for initial processing of ions received therefrom, and a downstream section 18 containing one or more mass analyzers (e.g., 110 and 114), a collision cell (e.g., 112), and a detector 118. Ions generated by the ion source 104 can be successively transmitted through the elements of the upstream section 16 (e.g., curtain plate 30, orifice plate 32, QJet 106, and Q0 108) to result in a radially focused ion beam (e.g., travelling in the z-direction along the central longitudinal axis) for further mass analysis within the analyzer portion 18).

The ionization chamber 14, within which analytes contained within the fluid sample discharged from the ion source 104 can be ionized, is separated from a gas curtain chamber by a curtain plate 30 defining a curtain plate aperture in fluid communication with the downstream section via the sampling orifice of an orifice plate 32. In accordance with various aspects of the present teachings, a curtain gas supply 31 can provide a curtain gas flow (e.g., of $N_2$) between the curtain plate 30 and orifice plate 32 to aid in keeping the downstream section of the mass spectrometer system clean by de-clustering and evacuating large neutral particles. By way of example, a portion of the curtain gas can flow out of the curtain plate aperture into the ionization chamber 14, thereby preventing the entry of droplets through the curtain plate aperture. Curtain gas can flow counter-current in at least a portion of the curtain chamber and ions may drift through the curtain gas flow as a result of the electric field between the curtain plate 30 and orifice plate 32. In such aspects, the curtain gas flow provided to the curtain chamber can be greater than the vacuum drag through the sampling orifice of the orifice plate 32.

A second gas source 33 is shown for delivery of an internal curtain gas or ICG to the ion guide 106. It will appreciated that the gas source 33, like source 31, encompasses a gas supply a regulator and a controller (e.g., a programmed processor), as known in the art, to control the amount of gas flowing into the ion channel 106 to divert unwanted neutral molecules. Gas source 31 and ICG gas source 33 can share a common gas supply but are adapted for independent control. Conduit 105 is shown schematically to deliver the ICG from source 33 to the ion guide channel 106. As will be explained further below, the conduit 105 encompasses various embodiments, including a cross-flow or a direct counter-flow configuration. Ion guide 106 is shown schematically in FIG. 1 as a single stage QJet region. However, it should be appreciated that in other applications, a multi-stage QJet region may be desired (such as the dual QJet shown in FIG. 2 and discussed below). Although not shown, ion guide 106 will typically reside in its own vacuum region. For example, the gap between the curtain plate 30 and orifice plate 32 can be slightly above atmospheric pressure, the QJet region of ion guide 106 can be about 2.5 Torr while the Q0 region (108) can be at about 6 mTorr. (These numerical values are given for illustrative purposes only.)

The mass spectrometer system 100 also includes a power supply and controller 20 that can be coupled to the various components so as to operate the mass spectrometer system 10 to reduce the ion flux transmitted into the downstream high-vacuum section 18 (e.g., during non-analytical periods) in accordance with various aspects of the present teachings.

As shown, the depicted system 100 includes a sample source 102 configured to provide a fluid sample to the ion source 104. The sample source 102 can be any suitable sample inlet system known to one of skill in the art and can be configured to contain and/or introduce a sample (e.g., a liquid sample containing or suspected of containing an analyte of interest) to the ion source 104. The sample source 102 can be fluidly coupled to the ion source so as to transmit a liquid sample to the ion source 104 (e.g., through one or more conduits, channels, tubing, pipes, capillary tubes, etc.) from a reservoir of the sample to be analyzed, from an in-line liquid chromatography (LC) column, from a capillary electrophoresis (CE) instrument, or an input port through which the sample can be injected, all by way of non-limiting example. In some aspects, the sample source 102 can comprise an infusion pump (e.g., a syringe or LC pump) for continuously flowing a liquid carrier to the ion source 104, while a plug of sample can be intermittently injected into the liquid carrier.

The ion source 104 can have a variety of configurations but is generally configured to generate ions from analytes contained within a sample (e.g., a fluid sample that is received from the sample source 102). In the exemplary embodiment depicted in FIG. 1, the ion source 104 comprises an electrospray electrode, which can comprise a capillary fluidly coupled to the sample source 102 and which terminates in an outlet end that at least partially extends into the ionization chamber 14 to discharge the liquid sample therein. As will be appreciated by a person skilled in the art in light of the present teachings, the outlet end of the electrospray electrode can atomize, aerosolize, nebulize, or otherwise discharge (e.g., spray with a nozzle) the liquid sample into the ionization chamber 14 to form a sample plume comprising a plurality of micro-droplets generally directed toward (e.g., in the vicinity of) the curtain plate aperture. As is known in the art, analytes contained within the micro-droplets can be ionized (i.e., charged) by the ion source 104, for example, as the sample plume is generated. In some aspects, the outlet end of the electrospray electrode can be made of a conductive material and electrically coupled to a power supply (e.g., voltage source) operatively coupled to the controller 20 such that as fluid within the micro-droplets contained within the sample plume evaporate during desolvation in the ionization chamber 14, bare charged analyte ions or solvated ions are released and drawn toward and through the curtain plate aperture. In some alternative aspects, the discharge end of the sprayer can be non-conductive and spray charging can occur through a conductive union or junction to apply high voltage to the liquid stream (e.g., upstream of the capillary). It will be appreciated that controller 20 can be and typically is, operatively coupled to other components of the system 100. The various other connections have been omitted for ease of illustration.

Though the ion source 104 is generally described herein as an electrospray electrode, it should be appreciated that any number of different ionization techniques known in the art for ionizing analytes within a sample and modified in accordance with the present teachings can be utilized as the ion source 104. By way of non-limiting example, the ion source 104 can be an electrospray ionization device, a nebulizer assisted electrospray device, a chemical ionization device, a nebulizer assisted atomization device, a matrix-assisted laser desorption/ionization (MALDI) ion source, a photoionization device, a laser ionization device, a thermospray ionization device, an inductively coupled plasma (ICP) ion source, a sonic spray ionization device, a glow discharge ion source, and an electron impact ion source, DESI, among others. Further, as shown in FIG. 1, the ion source 104 can be disposed orthogonally relative to the curtain plate aperture and the ion path axis such that the plume discharged from the ion source 104 is also generally directed toward an exhaust port 15 of the ionization chamber 14. In this manner, liquid droplets and/or large neutral molecules that are not drawn into the curtain chamber 30 via the curtain plate orifice can be removed from the ionization chamber 14 so as to prevent accumulation and/or recirculation of the potential contaminants within the ionization chamber. In various aspects, a nebulizer gas can also be provided (e.g., about the discharge end of the ion source 104) to prevent the accumulation of droplets on the sprayer tip and/or direct the sample plume in the direction of the curtain plate aperture.

In some embodiments, upon passing through the orifice plate 32, the ions can traverse one or more initial vacuum chambers and/or quadrupoles (e.g., a QJet® quadrupole) to provide additional focusing of and finer control over the ion beam using a combination of gas dynamics and radio frequency fields prior to being transmitted into the downstream high-vacuum section 18. In accordance with various aspects of the present teachings, it will also be appreciated that the exemplary ion guides described herein can be disposed in a variety of front-end locations of mass spectrometer systems. By way of non-limiting example, the ion guide 108 can serve in the conventional role of a QJet® ion guide (e.g., operated at a pressure of about 1-10 Torr), as a conventional Q0 focusing ion guide (e.g., operated at a pressure of about 3-15 mTorr) preceded by a QJet® ion guide, as a combined Q0 focusing ion guide and QJet® ion guide (e.g., operated at a pressure of about 3-15 mTorr), or as an intermediate device between the QJet® ion guide and Q0 (e.g., operated at a pressure in the 100s of mTorr, at a pressure between a typical QJet® ion guide and a typical Q0 focusing ion guide).

As shown, the upstream section 16 of system 100 is separated from the curtain chamber via orifice plate 32 and generally comprises a first RF ion guide 106 (e.g., QJet® of SCIEX) and a second RF guide 108 (e.g., Q0). In some exemplary aspects, the first RF ion guide 106 can be used to capture and focus ions using a combination of gas dynamics and radio frequency fields. By way of example, ions can be transmitted through the sampling orifice, where a vacuum expansion occurs as a result of the pressure differential between the chambers on either side of the orifice plate 32. By way of non-limiting example, the pressure in the region of the first RF ion guide can be maintained at about 2.5 Torr pressure. The QJet 106 transfers ions received thereby to subsequent ion optics such as the Q0 RF ion guide 108 through the ion lens IQ0 107 disposed therebetween. The Q0 RF ion guide 108 transports ions through an intermediate pressure region (e.g., in a range of about 1 mTorr to about 10 mTorr) and delivers ions through the IQ1 lens 109 to the downstream section 18 of system 100.

The downstream section 18 of system 10 generally comprises a high vacuum chamber containing the one or more mass analyzers for further processing of the ions transmitted from the upstream section 16. As shown in FIG. 1, the exemplary downstream section 18 includes two mass analyzers 110, 114 (e.g., elongated rod sets Q1 and Q3) and a third elongated rod set q2 112 disposed therebetween that can be operated as a collision cell (rod sets Q1, q2, and Q3 are separated by orifice plates IQ2 between Q1 and q2, and IQ3 between q2 and Q3), as well as a detector 118, though more or fewer mass analyzer elements can be included in systems in accordance with the present teachings. For example, after being transmitted from Q0 through the exit aperture of the lens IQ1, ions can enter the adjacent quadrupole rod set Q1, which can be situated in a vacuum chamber that can be evacuated to a pressure that can be maintained lower than that of chamber in which RF ion guide 108 is disposed. By way of non-limiting example, the vacuum chamber containing Q1 can be maintained at a pressure less than about $1\times10^{-4}$ Torr (e.g., about $5\times10^{-5}$ Torr), though other pressures can be used for this or for other purposes. As will be appreciated by a person of skill in the art, the quadrupole rod set Q1 can be operated as a conventional transmission RF/DC quadrupole mass filter that can be operated to select an ion of interest and/or a range of ions of interest. By way of example, the quadrupole rod set Q1 can be provided with RF/DC voltages suitable for operation in a mass-resolving mode. As should be appreciated, taking the physical and electrical properties of Q1 into account, parameters for an applied RF and DC voltage can be selected so that Q1 establishes a transmission window of chosen m/z ratios, such that these ions can traverse Q1 largely unperturbed. Ions having m/z ratios falling outside the window, however, do not attain stable trajectories within the quadrupole and can be prevented from traversing the quadrupole rod set Q1. It should be appreciated that this mode of operation is but one possible mode of operation for Q1. By way of example, the lens IQ2 between Q1 and q2 can be maintained at a higher offset potential than Q1 such that the quadrupole rod set Q1 be operated as an ion trap. In some aspects, the ions can be Mass-Selective-Axially Ejected from the Q1 ion trap in a manner described by Hager in "*A new Linear ion trap mass spectrometer*," Rapid Commun. Mass Spectro. 2002; 16: 512-526, and accelerated into q2, which could also be operated as an ion trap, for example. Ions passing through the quadrupole rod set Q1 can pass through the lens IQ2 and into the adjacent quadrupole rod set q2, which as shown can be disposed in a pressurized compartment and can be configured to operate as a collision cell at a pressure approximately in the range of from about 1 mTorr to about 10 mTorr, though other pressures can be used for this or for other purposes. A suitable collision gas (e.g., nitrogen, argon, helium, etc.) can be provided by way of a gas inlet (not shown) to thermalize and/or fragment ions in the ion beam. In some embodiments, the quadrupole rod set q2 and entrance and exit lenses IQ2 and IQ3 can also be configured as an ion trap. Ions that are transmitted by q2 can pass into the adjacent quadrupole rod set Q3, which is bounded upstream by IQ3 and downstream by an exit lens. As will be appreciated by a person skilled in the art, the quadrupole rod set Q3 can be operated at a decreased operating pressure relative to that of q2, for example, less than about $1\times10^{-4}$ Torr (e.g., about $5\times10^{-5}$ Torr), though other pressures can be used for this or for other purposes. As will be appreciated by a person skilled in the art, Q3 can be operated in a number of manners, for example as a scanning RF/DC quadrupole or as a linear ion trap. The Q3 can also be replaced with a ToF or trap analyzer. Following processing or transmission through Q3, the ions can be transmitted into the detector 118 through the exit lens. The detector 118 can then be operated in a manner known to those skilled in the art in view of the systems, devices, and methods described herein. As will be appreciated by a person skill in the art, any known detector, modified in accord with the teachings herein, can be used to detect the ions. It will also be appreciated by those skilled in the art that the downstream section 18 can additionally include additional ion optics, including RF-only stubby ion guides (which can serve as a Brubaker lens) as schematically depicted. Typical ion guides of ion guide regions Q0, Q1, q2 and Q3 in the present teachings, can include at least one electrode as generally known in the art, in addition to ancillary components generally required for structural support. For convenience, the mass analyzers 110, 114 and collision cell 112 are generally referred to herein as quadrupoles (having four rods), though the elongated rod sets of at least some of the system regions, e.g., the collision cell, the Q0 ion guide and the QJet ion guide, can be any other suitable multipole configurations. It will also be appreciated that the one or more mass analyzers can be any of triple quadrupoles, single quadrupoles, time of flights, linear ion traps, quadrupole time of flights, Orbitrap or other Fourier transform mass spectrometers, all by way of non-limiting example.

Figure 2:
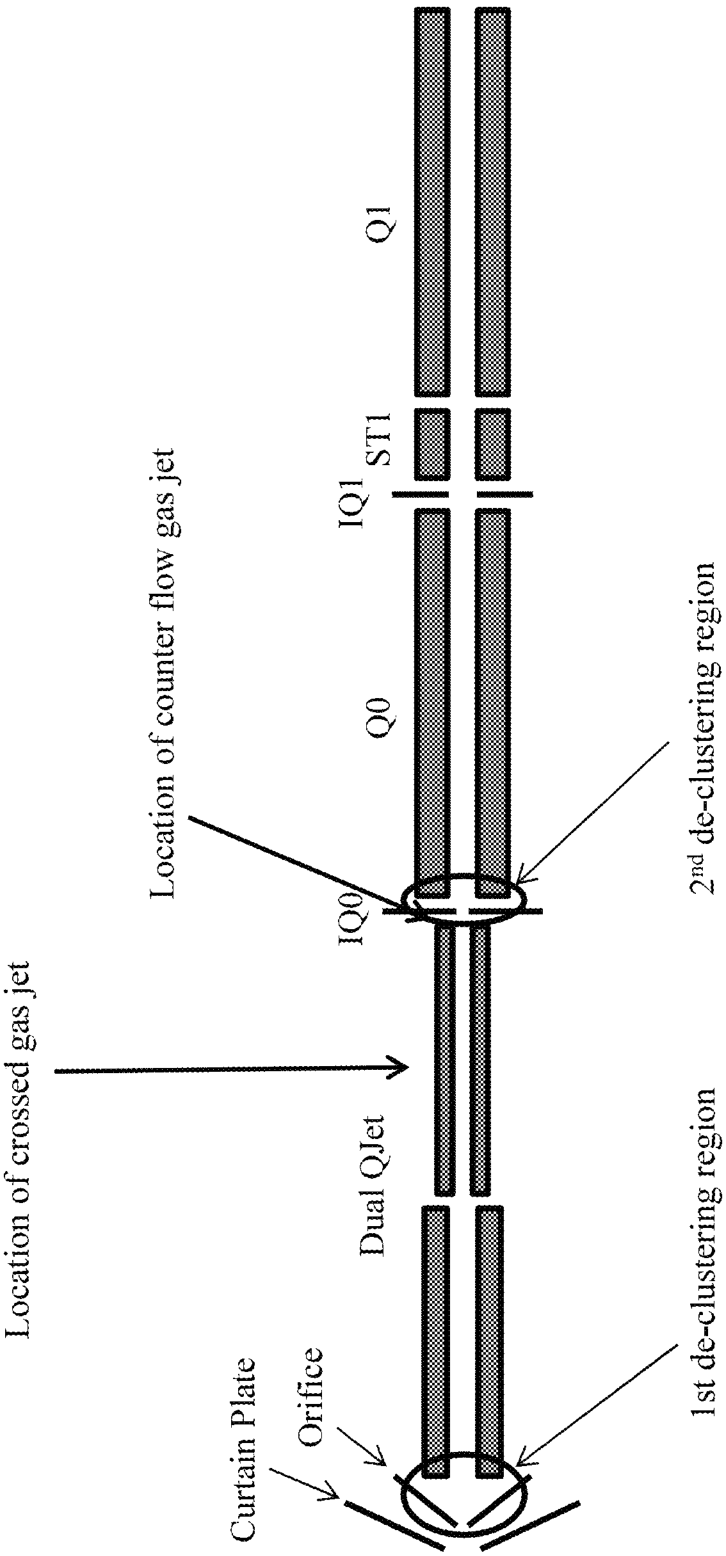
FIG. 2 is another schematic illustration of a mass spectrometer system in accordance with the invention, emphasizing the functional elements.

The mass spectrometer of FIG. 1 is shown more schematically in FIG. 2. In an ideal system, only ions enter the sampling orifice of the mass spectrometer. It is reasonable to expect that ions expanding from atmosphere will have a distribution of cluster ion sizes and cluster types. Cluster ions will contain various combinations of solvent and analyte molecules. Upon expanding into a lower pressure region the cluster distribution will shift towards smaller cluster sizes as solvent and analyte molecules leave the cluster. To further aid in the de-clustering process a DC potential drop can be applied between the sampling orifice and the QJet rods, this is known as the de-clustering potential (DP). It should also be noted that clusters can still be formed in the expansion itself with temperatures that are calculated to be as low a few tens of degrees Kelvin under the conditions of the expansion. Some reheating of the clusters then occurs at the mach disc where the pressure increases leading to an increase in the number of collisions and a subsequent reduction in the number of clusters. The number or density of clusters remaining would depend upon numerous factors including the bond strength of the cluster bonds, the degree of reheating at the mach disc, the kinetic energy of the cluster as determined by the value of DP, the base pressure which defines the gas density at the mach disc and subsequent re-expansions, the strength of the RF fields from the quadrupole ion guide and the Mathieu q values of the ion clusters. In any case we know that clusters exist from the effect that DP has on the appearance of the mass spectrum. It is also known that clusters exist as far down as the IQ0 lens of the partial ion path shown in FIG. 2. It is known in the field that applying a potential difference between IQ0 and Q0 leads to a modification of the mass spectrum normally attributed to a de-clustering mechanism. The two regions of de-clustering are highlighted in FIG. 2.

Figure 2A:
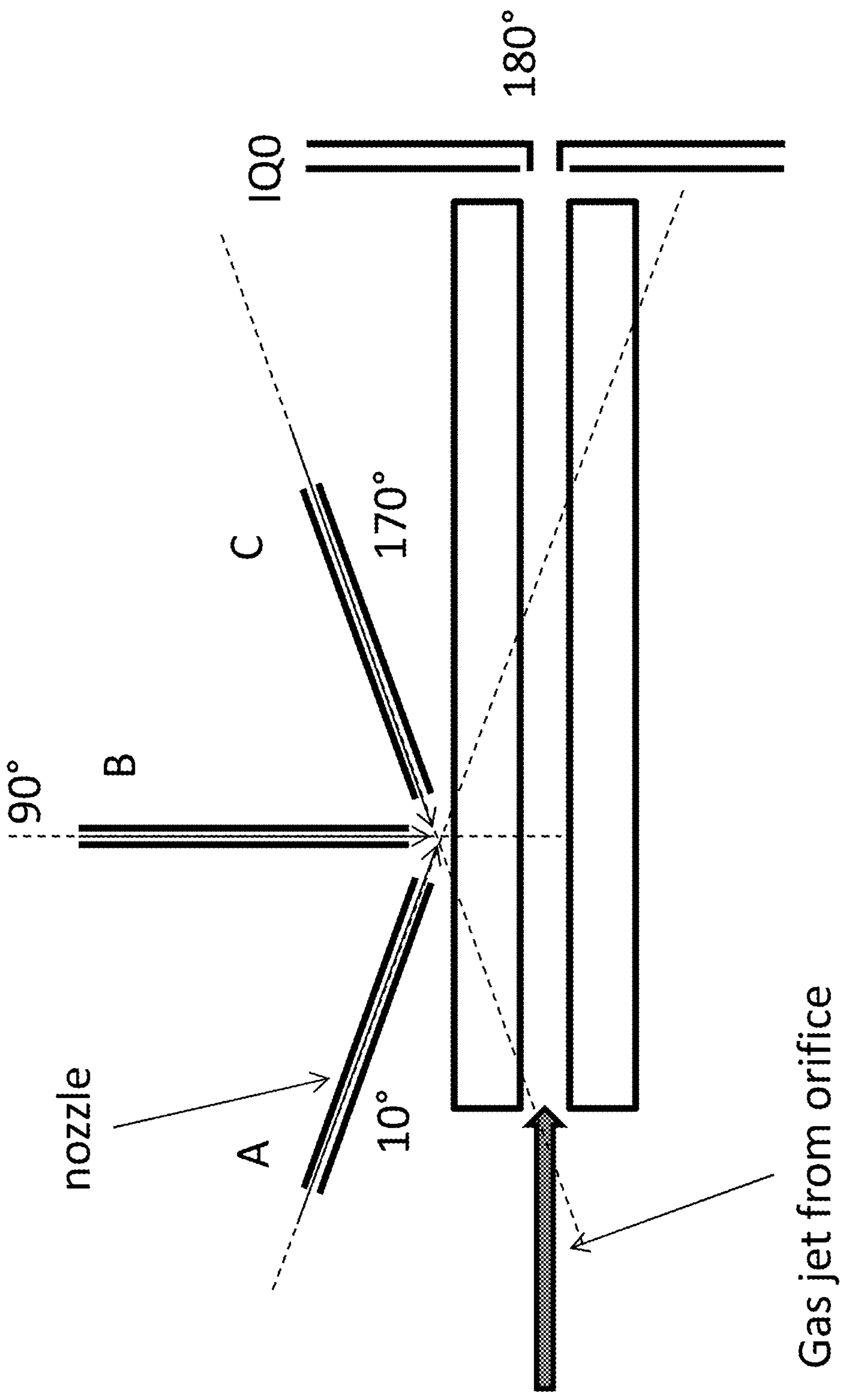
FIG. 2A is another schematic illustration of a mass spectrometer system in accordance with the invention showing alternative contra-flow embodiments (crossed flow and counter flow)

As shown in FIG. 2A, the angle of the tube can vary from about 10 degrees to 170 degrees with respect to the quadrupole (QJet) axis. The requirement is that the gas jet from the nozzle, in either of the locations, must deflect the gas jet from the orifice away from the aperture in the lens labeled IQ0. The minimum and maximum angles will depend upon the length of the QJet, diameter of the nozzle tube and how close the tube is to the QJet electrodes.

As also shown in FIG. 2A, an alternative approach would be to introduce a counter gas flow, e.g., originating from between the two plates at IQ0 at 180 degrees to the gas jet from the orifice.

Figure 2B:
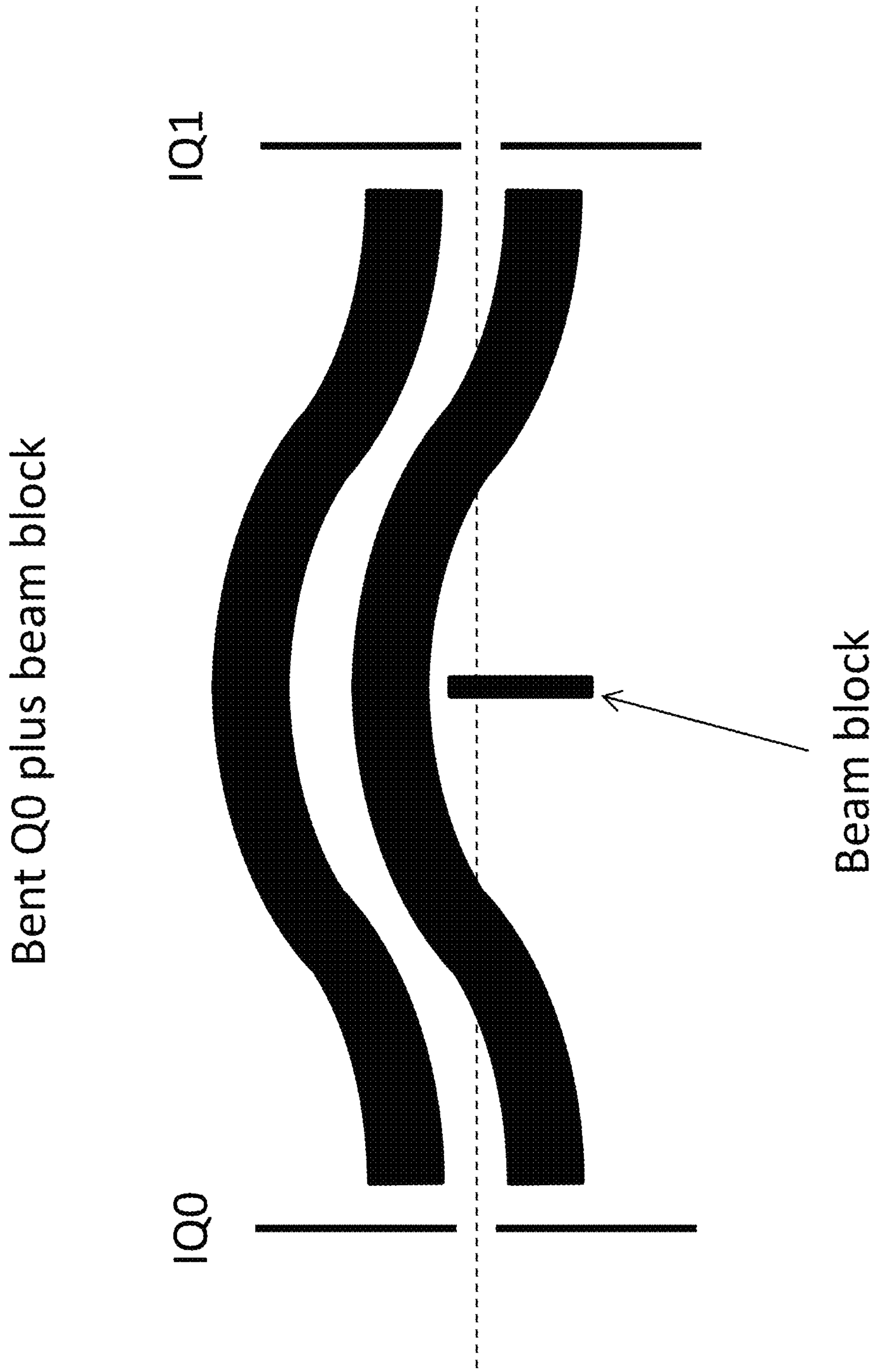
FIG. 2B is a schematic illustration of an alternative embodiment, in which bent electrodes are used to block neutral molecules.

The present invention can also be used in conjunction with other mechanisms for blocking neutral molecules, such as bent Q0 ion optics, as shown schematically in FIG. 2B.

The goal of the internal curtain gas is to prevent neutrals created in the $1^{st}$ de-clustering region from passing the IQ0 lens and causing contamination of the optics downstream from IQ0. When the instrument operates with no potential drop between the IQ0 lens and the Q0 ion guide, the majority of de-clustering will occur in the $1^{st}$ de-clustering region between the sampling orifice and QJet ion optic.

The following examples are provided for further elucidation of various aspects of the present teachings. The examples are only for illustrative purposes and are not intended to indicate necessarily the optimal ways of practicing the present teachings or the optimal results that may be obtained.

Examples and Experimental Results

Experiments were carried out on a modified QTrap 5500 which utilized a dual QJet ion guide and a larger orifice so that its performance was equivalent to that of a QTrap 6500 without the high dynamic range detection system. For the experiments detailed herein, two different configurations were tested. The first configuration was a crossed gas jet while the second configuration created a gas jet that was directed along the QJet axis towards the sampling orifice. Additionally, some experiments utilized the bent Q0 ion optic with a beam blocker while some utilized the linear Q0 ion optic (as illustrated in FIG. 2B).

Crossed Jet Configuration

Figure 3:
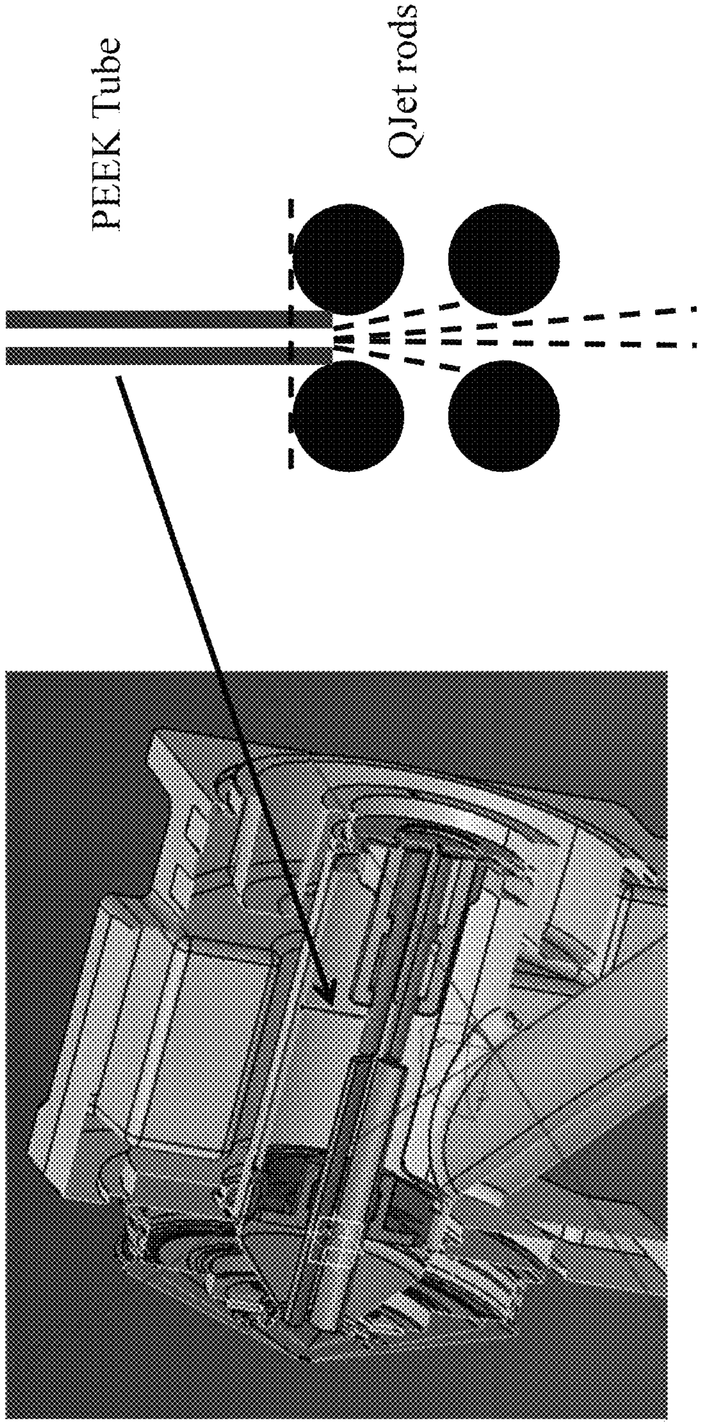
FIG. 3 is a schematic illustration of one embodiment of an ion guide and an (orthogonal) internal curtain gas inlet according to the invention.

For the crossed jet experiments a PEEK tube (serving as an internal curtain gas nozzle) was brought into the QJet chamber and inserted between the QJet electrodes as shown in FIG. 3. The ions enter the sampling orifice at the left side of the catia picture, pass through the oval shaped QJet rods and into the round shaped QJet rods. The PEEK tube was inserted between the round QJet rods just upstream of the mounting structures. The horizontal red line represents the location of the end of the tube used in the CFD simulations which were performed in addition to the experiments. The PEEK tube had an ID of 0.508 mm and an OD of 1.588 mm. The PEEK tube diameter matched the spacing of the downstream QJet electrodes thus allowing the QJet electrodes to serve as an alignment tool.

Counter Gas Flow Configuration

Figure 4:
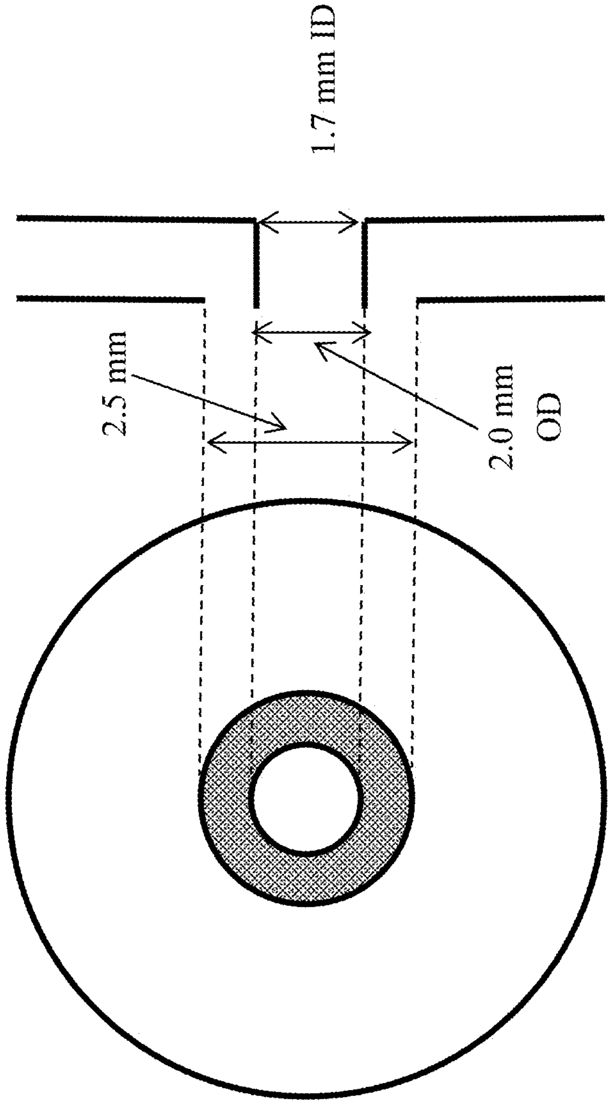
FIG. 4 is a schematic illustration of another embodiment of an ion guide and an (180 degree) internal curtain gas inlet according to the invention.

The second configuration utilized a dual lens IQ0 in which nitrogen was flowed between the lenses and back towards the sampling orifice. A front view and a side view of the lens is shown in FIG. 4.

Figure 5A:
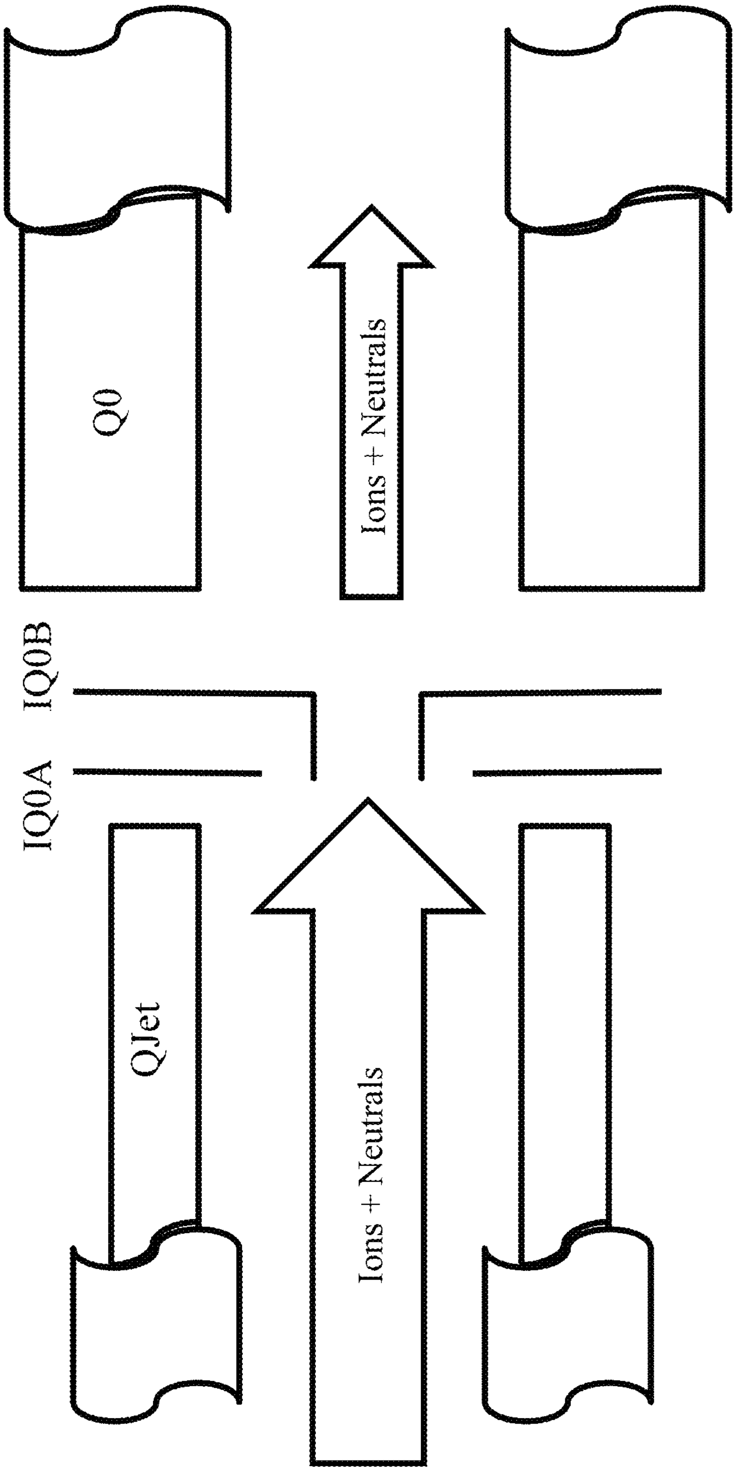
FIG. 5A is a schematic illustration of the embodiment of FIG. 4 prior to the introduction of an internal curtain gas.
Figure 5B:
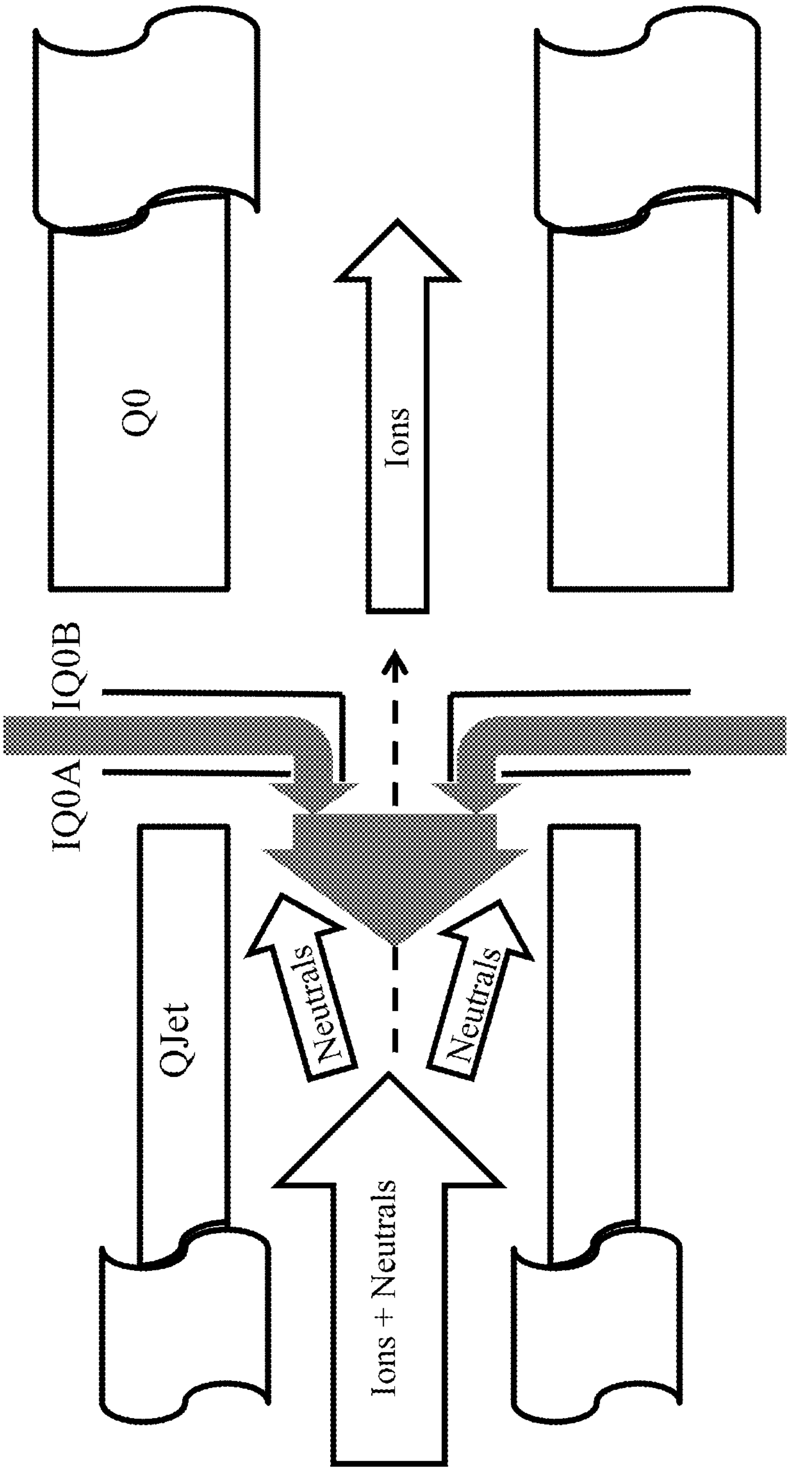
FIG. 5B is a schematic illustration of the embodiment of FIG. 4 during the introduction of an internal curtain gas.

FIG. 5A shows a side view of the lens including a portion of the QJet and Q0 rods (not to scale). FIG. 5A shows the expected path of ions and neutrals arising from upstream which then continue to pass through the IQ0 lens and further downstream along the ion path. FIG. 5B shows that applying a gas flow between the IQ0 lenses is expected to form a gas barrier (internal curtain gas) that blocks neutrals created upstream from passing through into the Q0 region.

The nitrogen gas flow through the PEEK tube was controlled using a Mass Flowmeter (Sure Flow Products, model GM-1SLPMD-125-5V-N2).

Figure 6:
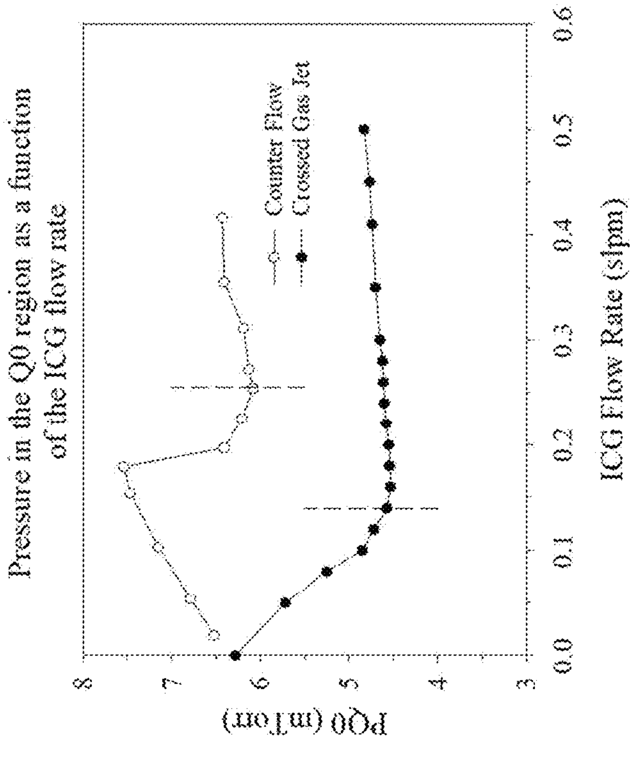
FIG. 6 is a graph of pressure in the Q0 region as a function of gas flow rate for both the orthogonal gas jet and 180 degree counter flow configurations.

FIG. 6 shows plots of the pressure in the Q0 region (as shown in FIG. 2) as a function of gas flow rate for both the crossed gas jet and counter flow configurations. In the case of the crossed gas jet the pressure in the Q0 region begins to drop as soon as the gas flow is turned on and continues to drop to a minimum at about 0.16 standard liter per minute (slpm) after which further increases lead to an increase in the Q0 pressure. The pressure drops initially because the gas jet is diverting the gas jet arising from the sampling orifice away from the IQ0 aperture. The higher Q0 pressure at zero flow is due to the impact pressure from the sampling orifice gas jet. Once the sampling orifice gas jet is fully diverted the Q0 pressure begins to increase simply because of the increased gas load into the QJet region from the crossed gas jet. The minimum Q0 pressure is 4.5 mTorr. At a flow rate of zero the pressure in Q0 is 6.3 mTorr which is 1.8 mTorr, or 40%, higher than the minimum Q0 pressure. The higher pressure is a result of the impact pressure at IQ0.

In the case of the counter gas flow the pressure in Q0 initially increases from 6.5 mTorr to a high of 7.5 mTorr, at a flow rate of about 0.2 slpm, before dropping to a low of 6.1 mTorr at a flow rate of 0.25 slpm. The explanation for this behavior is that when the counter flow gas is at low flow rates the additional gas leads to an increase in the local pressure in front of the IQ0 lens. When the flow rate is increased further the counter flow gas interferes with the gas jet from the sampling orifice. When the flow rate is sufficiently high the counter flow gas interferes further away from the IQ0 lens causing a reduction in the impact pressure from the sampling orifice gas jet. This causes a reduction in the Q0 pressure. Further increases in flow rate continue to lead to a higher local pressure in front of the IQ0 lens resulting in an increase in the Q0 pressure.

Figure 7A:
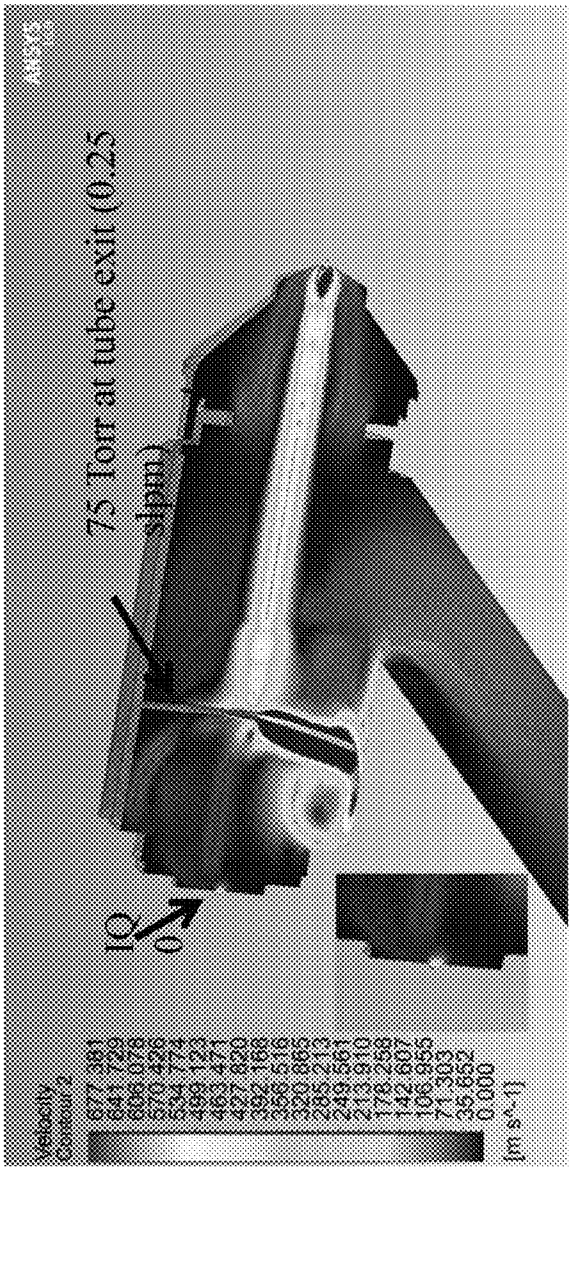
FIGS. 7A and 7B are computer simulations of velocity maps for gas flows within the QJet region for the orthogonal gas jet configuration.
Figure 7B:
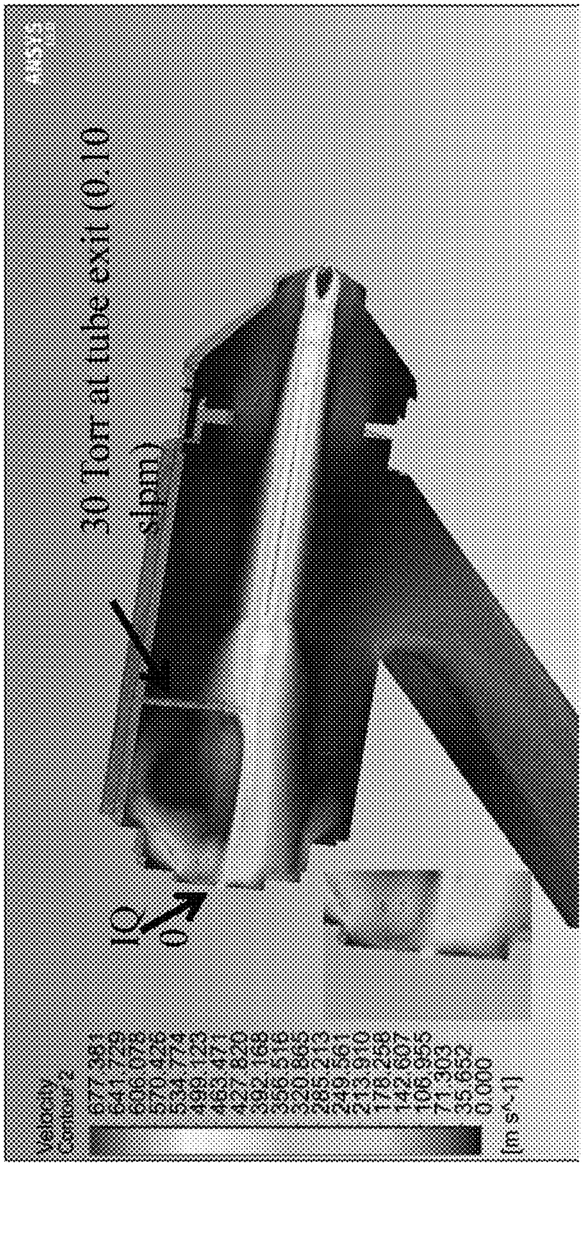
Figure 8A:
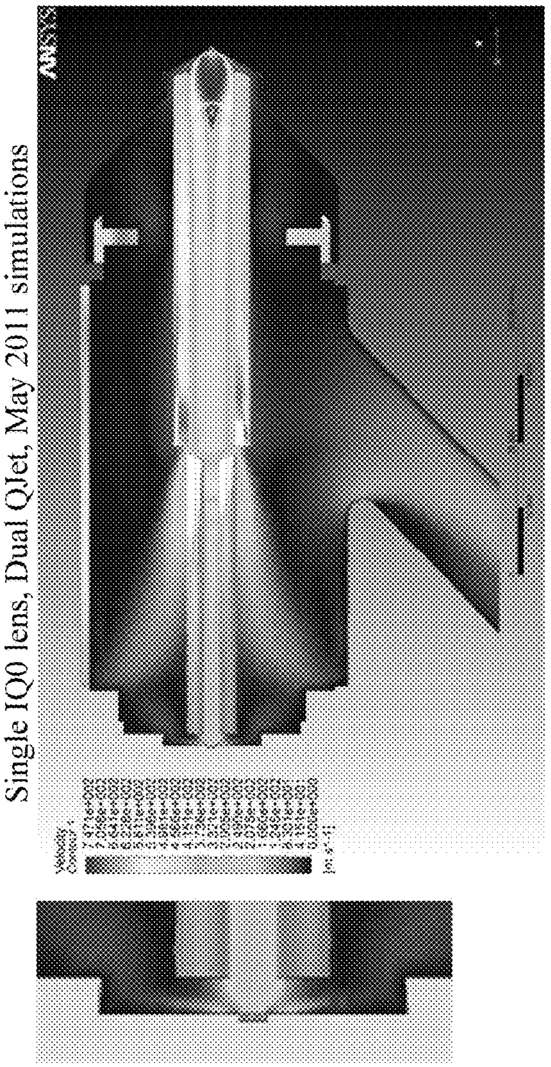
FIGS. 8A and 8B are computer simulations of velocity maps for gas flows within the QJet region for the 180 degree gas jet counter flow configuration.

FIGS. 7A and 7B show two examples of velocity maps for gas flows within the QJet region. The pressure at the tube exit is 30 and 75 Torr as indicated in the lower and upper panes. These pressures represent flows of 0.10 and 0.25 slpm respectively. It should be noted that the geometrical configuration has the tube located further downstream than what was used in the actual experiments, however, this does not affect the qualitative description. At a flow rate of 0.1 slpm the gas jet originating from the sampling orifice is diverted significantly from the IQ0 aperture while at 0.25 slpm the gas beam is diverted dramatically. Each pane contains an expanded view of the IQ0 region. For comparative purposes FIG. 8A shows the CFD results for the dual QJet without the crossed gas jet. In that case, the gas jet from the sampling orifice impacts fully upon the IQ0 lens, resulting in the maximum pressure in the Q0 region. The CFD simulations support the experimental observations with regard to the pressure in the Q0 region.

Figure 8B:
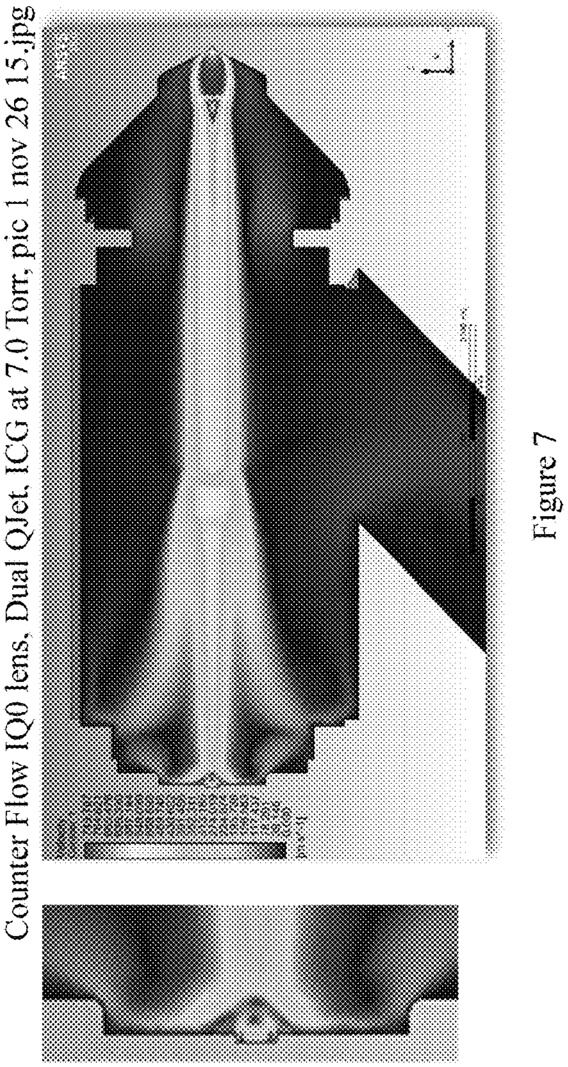

FIG. 8A shows the velocity contour map for the gas flow within the normal dual QJet set-up which uses a 1.7 mm diameter aperture for IQ0. The sampling orifice was 0.72 mm diameter in this simulation. FIG. 8B shows the velocity contour map for the counter flow set-up where the IQ0 lenses have the dimensions shown in FIG. 4 in which the aperture leading to the Q0 region is 1.7 mm in diameter. Setting the pressure at the IQ0 lens to 7.0 Torr results in the formation of a gas curtain in front of the IQ0 aperture. In this region the bulk gas velocity drops dramatically.

Figure 9:
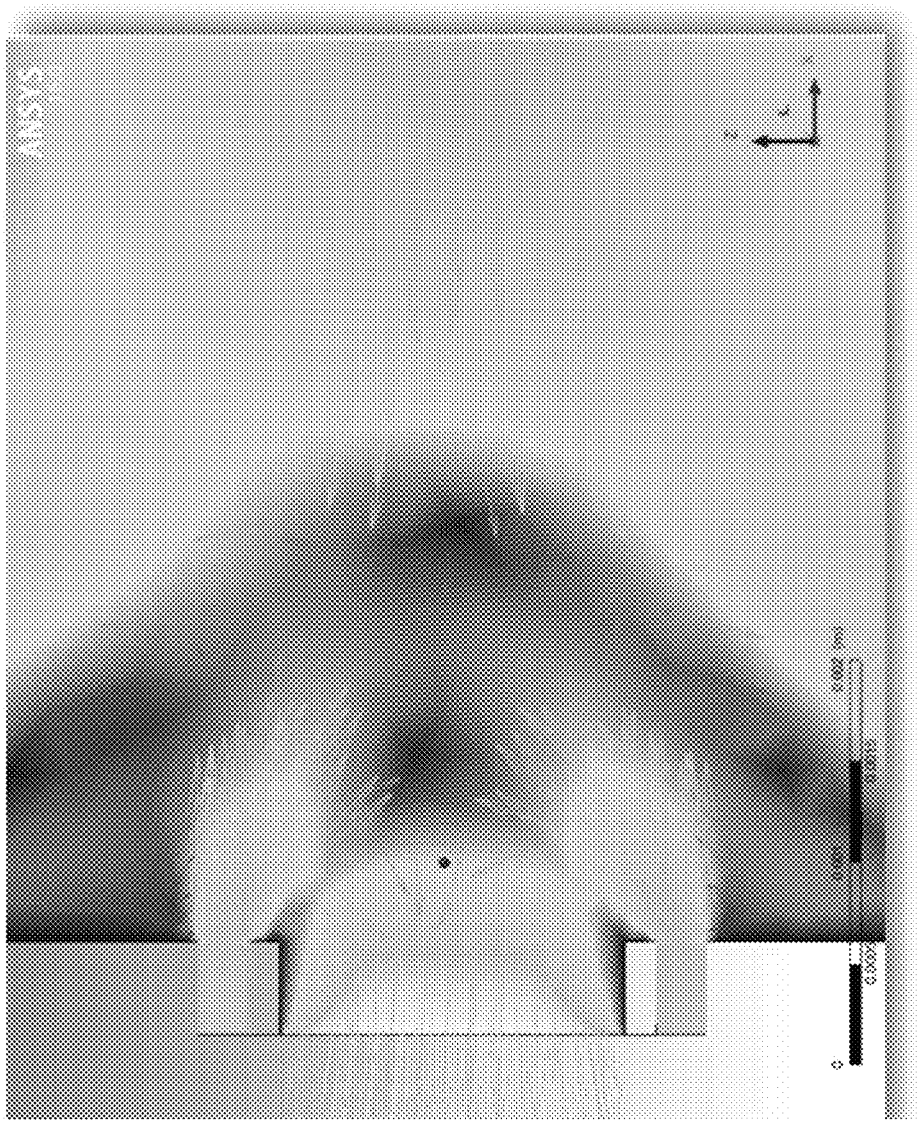
FIG. 9 is an expanded computer simulated view of curtain gas inlet region with the arrows indicating the direction and magnitude of the internal curtain gas (ICG) flow in a 180 degree counter flow configuration.

FIG. 9 shows an expanded view of this region with the arrows indicating the direction and magnitude of the gas flow. The gas flow originating from the IQ0 lens is causing a diversion of the gas jet from the sampling orifice. Neutrals entrained in the gas jet from the sampling orifice would then also be diverted from passing through the IQ0 aperture.

Figure 10A:
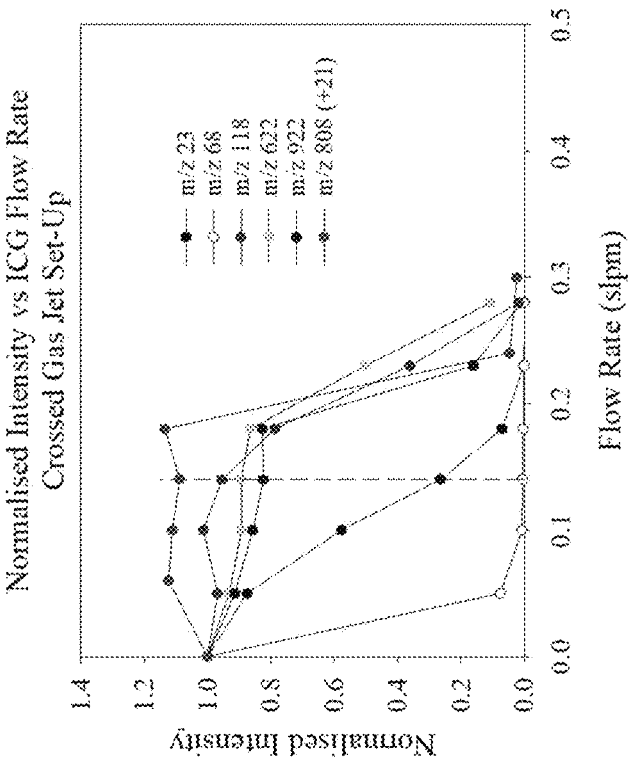
Figure 10B:
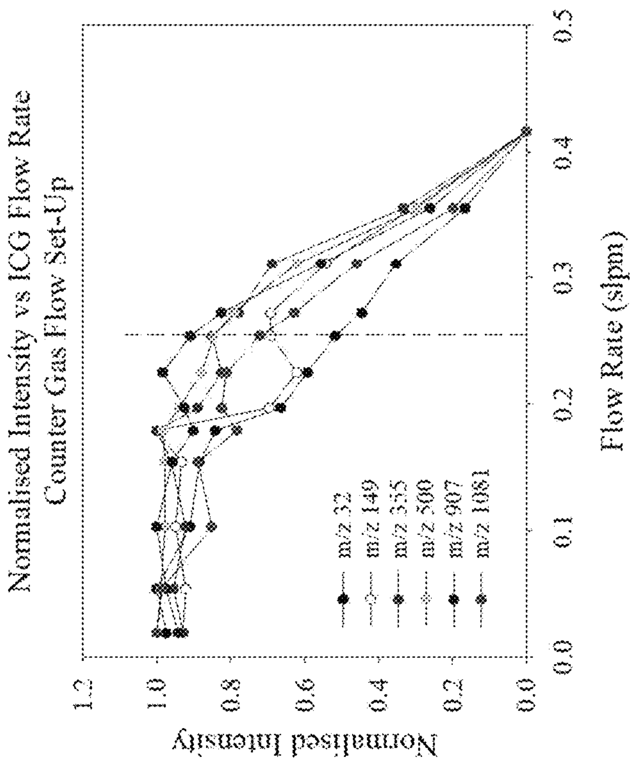
FIG. 10B shows the results obtained when using the 180 degree counter flow configuration.
Figure 11A:
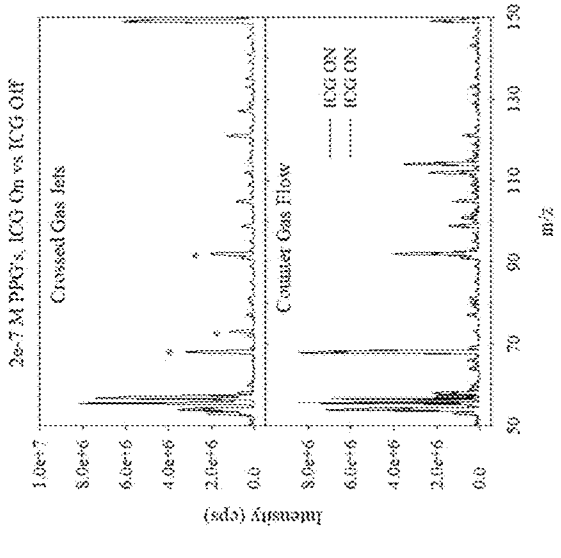
FIGS. 11A, 11B, 11C and 11D show a comparison of mass spectra obtained for each of the orthogonal gas jet and counter-flow configurations with and without the ICG applied.
Figure 11B:
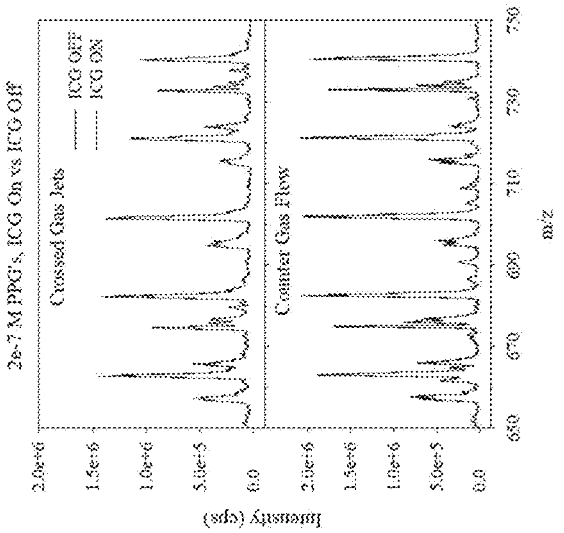
Figure 11C:
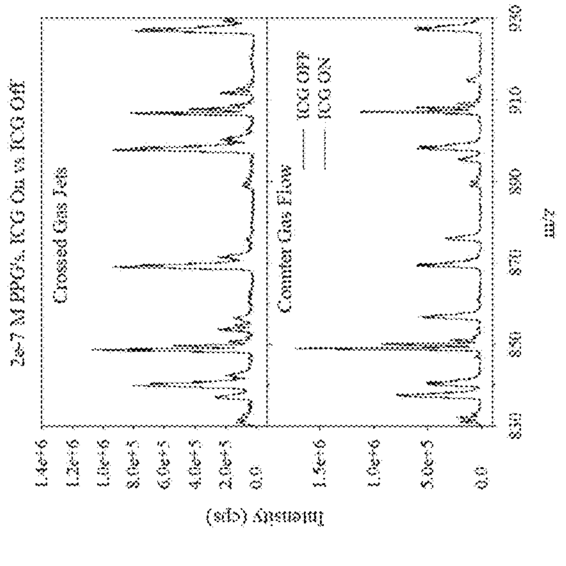
Figure 11D:
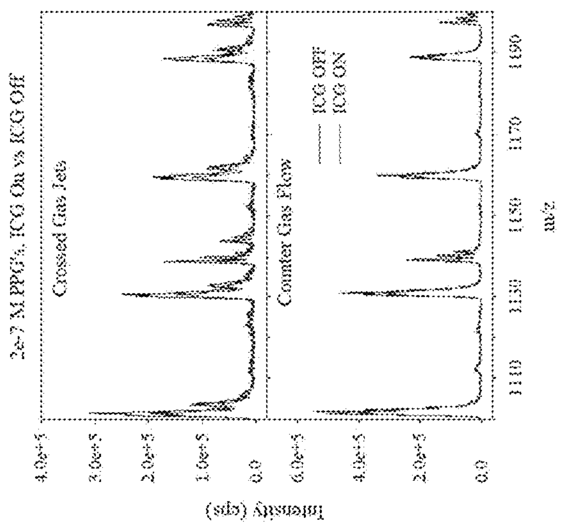
Figure 12A:
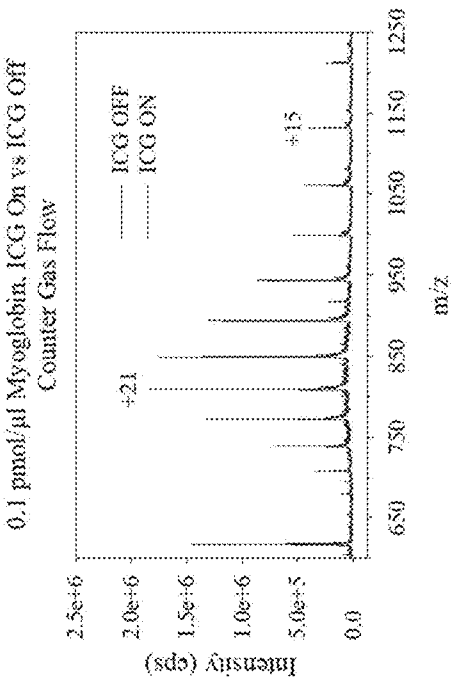
FIGS. 12A, 12B, 12C and 12D shows a mass spectrum of myoglobin with expanded views for three select ions.
Figure 12B:
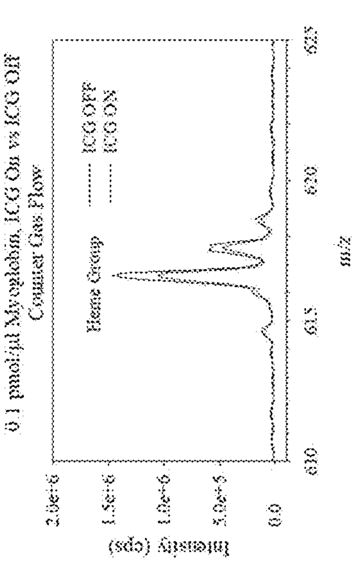
Figure 12C:
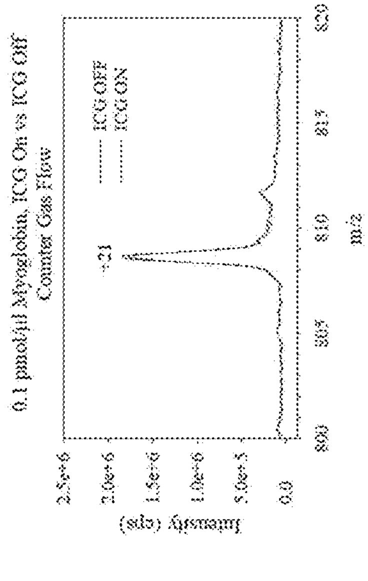
Figure 12D:
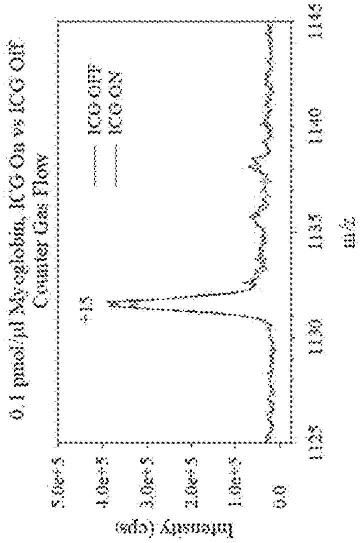

FIG. 10A shows the normalized signal intensity as a function of gas flow rate for the crossed gas jet configuration while FIG. 10B shows the results obtained when using the counter gas flow configuration. The vertical broken lines are the flow rates that gave the minimum Q0 pressure based upon the pressure measurements shown in FIG. 6. In both cases ion losses are more significant for low mass ions than higher mass ions. Ions used in the crossed gas jet experiments were from the 1/100 Agilent solution and the 0.1 pmol/μl myoglobin solution (m/z 808, +21 charge state). In general there are losses of no more than about 20% at a flow rate of 0.14 slpm for the crossed jet with the exception of the m/z 23 and 68 ions. The ion m/z 68 decreases dramatically at a gas flow rate of 0.05 slpm while m/z 23 is affected only marginally. This suggests a different loss mechanism which is unclear at this time. The data for the counter gas flow configuration shows less loss for low mass ions. In this case the data shown is obtained using the 2e−7 M PPG solution.

FIGS. 11A-11D show a comparison of mass spectra obtained for each configuration with and without the internal curtain gas (ICG) applied. The flow rate for the ICG was set to the values shown by the vertical broken lines shown in FIGS. 10A and 10B. The ICG on spectra are shown on the right hand side. At the mid mass ranges, FIGS. 11B and 11C, the spectra are identical. At higher masses, FIG. 11D, the counter gas flow configuration shows some loss in signal intensity. The amount of signal loss is less than what is seen for the crossed gas jet configuration. Significant differences are seen between the two configurations at low mass, FIG. 11A. In the counter gas flow configuration ion signal intensities are reduced for all ions by roughly the same extent. This was not the case for the crossed gas jet configuration where some ion signal intensities are dramatically reduced while others are either not affected or increased. The counter gas flow configuration has the least effect on the appearance of the mass spectrum The effect of the counter gas flow ICG on large multiply charged ions was also examined using myoglobin. The collision cross sections for apo-myoglobin are in the range of 2500 to 3500 $Å^2$ which means that they will suffer significantly more collisions with the gas from the ICG than smaller ions. FIGS. 12A-12D shows mass spectra of myoglobin with expanded views for three select ions. The heme group shows some loss, the +21 charge state ion shows no loss and the +15 charge state ion shows a minimal loss. The presence of the ICG affects the transmission of large, high charge state ions in a similar fashion to singly charged ions, i.e. minimal losses.

Figure 13A:
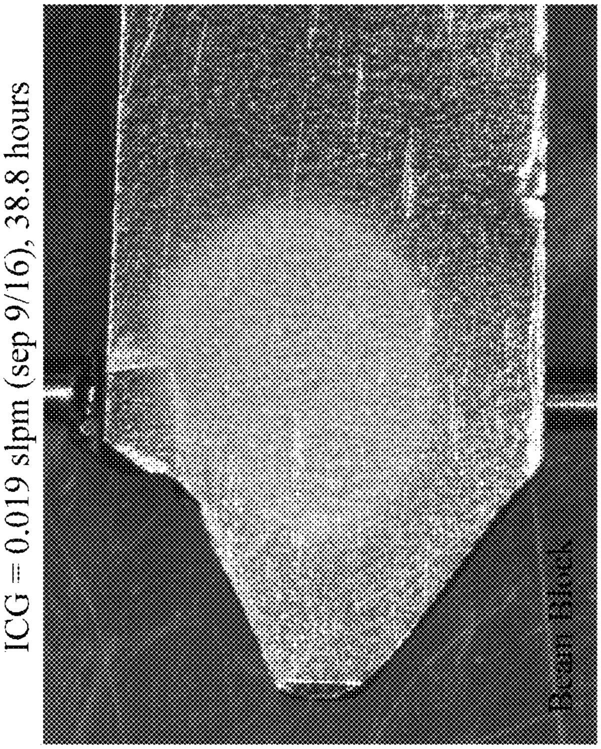
FIGS. 13A and 13B are photographs of neutral contaminant deposition on a beam block without, and with, the use of an internal curtain gas in the counter flow configuration, respectively.
Figure 13B:
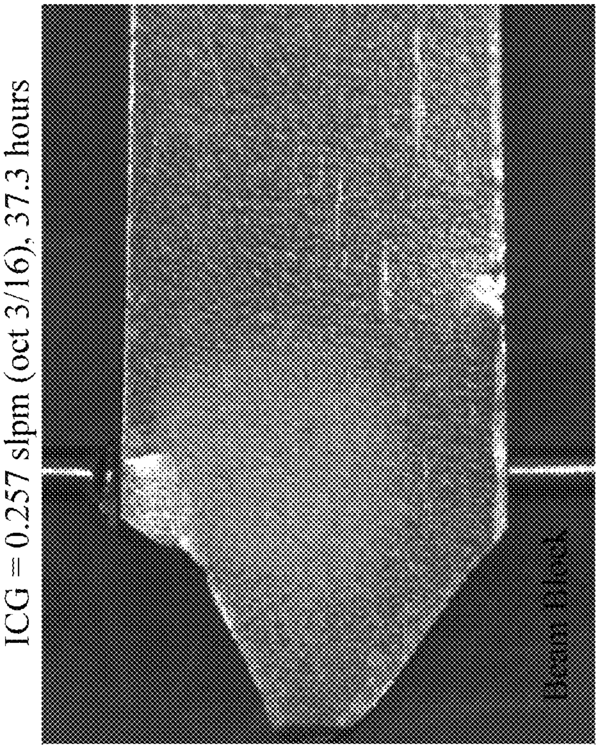

Two sets of key experiments were performed looking for the reduction of neutral contamination. The first experiment utilized the bent Q0 with beam block ion guide (See FIG. 2B) and the counter gas flow ICG. A 1/10 dilution of Hank's buffer was infused at 100 μl/min for a total of 38.8 hours with the ICG turned off. At the end of the experiment the beam block was removed and photographed. The experiment was then repeated with the ICG turned on at a flow rate of 0.257 slpm. This experiment was run for a total of 37.3 hours. FIGS. 13A and 13B show the pictures in a side by side comparison. There is a visible reduction in the amount of deposition on the beam block, estimated visually to be on the order of 80% or greater.

Figure 14A:
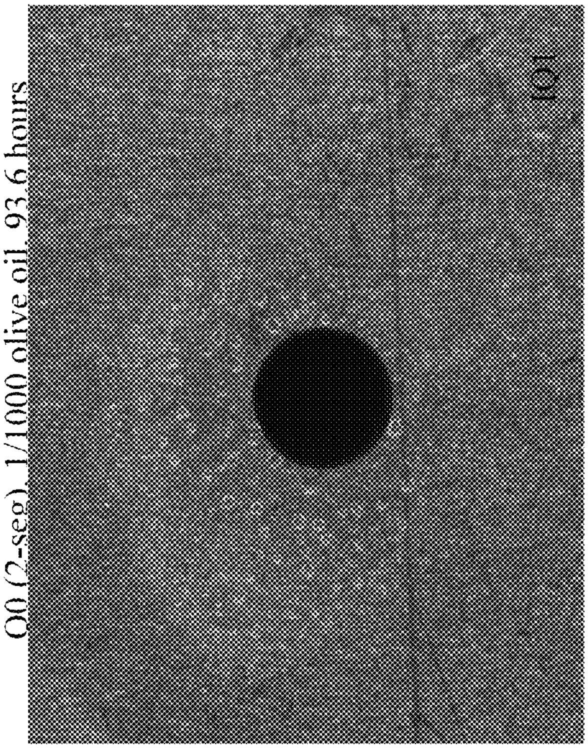
FIGS. 14A and 14B are photographs of neutral contaminant deposition on an IQ1 lens without, and with, the use of an internal curtain gas in the counter flow configuration, respectively.
Figure 14B:
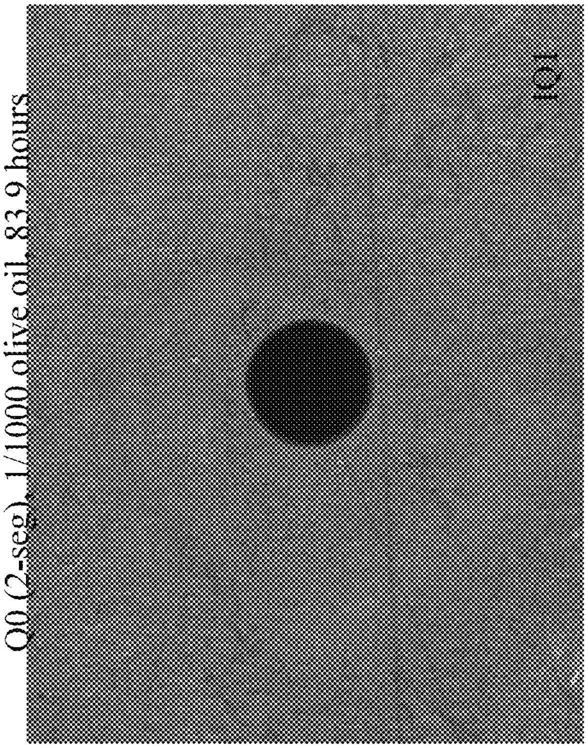

The next set of experiments were performed utilizing a linear Q0 and the counter gas flow ICG. In these experiments a 1/1000 olive oil solution was infused at 10 μl/min for 93.6 and 83.9 hours with the ICG turned off and on respectively. FIGS. 14A and 14B show side-by-side pictures of the IQ1 lens. With the ICG turned off there are droplets of olive oil. When the ICG is turned on the number of droplets is dramatically reduced with only three small droplets being visible. In addition, a deposition pattern is still visible in the picture with the ICG turned on indicating that not all particles have been stopped from striking the IQ1 lens. This is the same reasoning to what was concluded with the Hank's Buffer experiments using the beam block set-up. In both of the examples the ICG clearly demonstrates a reduction in neutral contamination at the beam block and the IQ1 lens.

It should also be understood that the teachings of invention are not limited to the exemplary mass spectrometer discussed above, and can be implemented in a variety of different mass spectrometers to reduce, and preferably eliminate, the contamination of the mass analyzers during time intervals when data is not acquired.

It is expected that it is also possible to use the ICG to completely block both ions and neutrals from passing the IQ0 lens. This would allow the ICG to be used to prevent downstream contamination when the instrument is not scanning. An experiment was carried out with the ICG set to 0.5 slpm using the crossed gas jet ICG configuration with the bent Q0 plus beam block. The 1/1000 olive oil was infused for 41.4 hours after which time the pictures of the beam block and IQ1 were taken. There was no sign of any deposition on either the beam block or IQ1 lens.

Figures 15A, 15B:
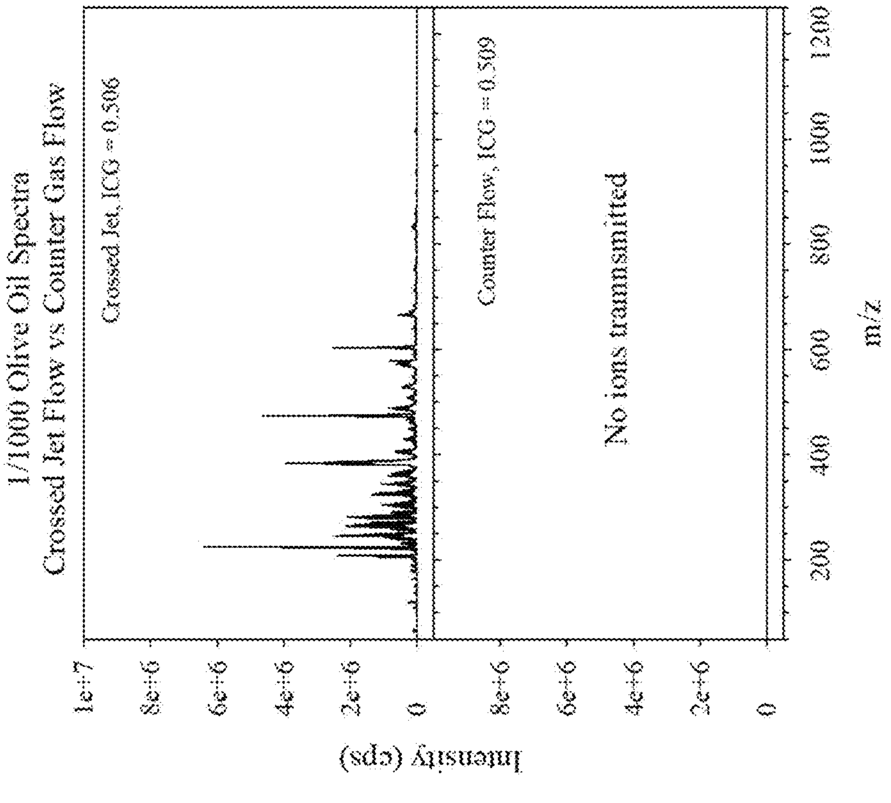

The mass spectrum of FIG. 15A shows that some ions were still transmitted through to the Q0 region. In this case the ion beam intensity is reduced to the point where the diameter of the ion beam is less than the diameter of the IQ1 lens aperture. The result was no ion contamination on the IQ1 lens. However, those ions can still be expected to cause ion burns on the mass filters. FIG. 15B shows that if the ICG is set to 0.5 slpm, while using the counter gas flow configuration, then no ions were transmitted through to the Q0 region. This will also protect the mass filters from ion burns when the instrument is not scanning.

With regard to the minimum required flow rate to produce a gas curtain, the ICG flow preferably should be greater than the flow of gas through the IQ0 aperture. This is the same logic that is used when setting the curtain gas flow between the curtain plate and sampling orifice. With the ICG set to zero, the pressure at the IQ0 aperture is defined by the impact pressure from the gas jet originating at the sampling orifice. The data of FIG. 6 indicates that when the ICG is turned on to a flow rate of 0.254 slpm the pressure in the Q0 region is only slightly lower than when the ICG is off. This indicates that when the ICG is on the throughput at IQ0 is the just slightly less than when the ICG is turned off. The pressure directly in front of the IQ0 aperture must be close to the impact pressure when the ICG is turned off. The impact pressure can be found by looking at the on axis pressure profile, FIG. 16, from the CFD simulations already shown in FIG. 8A. The pressure rises just in front of the IQ0 lens, near z=0 in FIG. 16, to about 3.1 Torr when the ICG is turned off.

To calculate the throughput of the IQ0 aperture and the throughput of the ring providing the ICG gas we need to know the pressure at the opening of each and the conductance of each opening.

The throughput is given by $$Q=PC \qquad 4$$

where Q is the throughput in Torr P is the pressure at the opening in Torr ($P_1$ below) and C is the conductance in l/s. The conductance of the ring and the IQ0 aperture can be found using the laminar flow equations for conductance through an aperture $$C = 20\frac{A}{(1-\delta)} \quad \text{for} \quad \delta \le 0.528 \qquad 5a$$

and $$C = 20A \quad \text{for} \quad \delta \le 0.03 \qquad 5b$$

where A is the area of the opening in $cm^2$ and δ is the ratio of the pressures on either side of the aperture, $P_2/P_1$, where $P_1$ is the high pressure value and $P_2$ is the low pressure value.

The conductance of the IQ0 aperture and the ICG ring opening are given in Table 1 below.

TABLE 1

| | IQ0 Aperture | ICG Ring Opening |
|---|---|---|
| Area ($cm^2$) | 0.0227 | 0.0177 |
| $P_1$ (Torr) | 3.1 | 7.0 |
| $P_2$ (Torr) | 0.006 | 3.1 |
| δ ($P_1/P_2$) | 0.002 | 0.443 |
| C (l/s) | 0.454 | 0.636 |

The ratio of the ICG throughput, $Q_{ICG\_ring}$, to the IQ0 throughput, $Q_{IQ0}$, can then be calculated using Equation 1.

$$\frac{Q_{ICG_{ring}}}{Q_{IQ0}} = \frac{P_{1,ICG\_ring}C_{ICG\_ring}}{P_{1,IQ0}C_{IQ0}} \qquad 6a$$

$$\frac{Q_{ICG_{ring}}}{Q_{IQ0}} = \frac{7.0*0.636}{3.1*0.454} = 3.2 \qquad 6b$$

which re-arranging gives $$Q_{ICG\_ring}=3.2Q_{IQ0} \qquad 6c$$

For the counter gas flow configuration the throughput of the ICG opening needs to be at least three times greater than the throughput of the IQ0 aperture in order to form the gas curtain. This will most likely be dependent upon the shape, the length of the tube in FIG. 2, whether the tube is a straight tube or a cone, etc. But, as a guideline for this particular set-up the flow rate through the ICG should preferably be at least three times the flow through the IQ0 aperture.

The simulation base pressure (2 Torr) was 35% lower than the measured impact pressure (3.1 Torr) at the IQ0 aperture. When the gas jet from the sampling orifice is fully diverted using a crossed gas jet, the pressure in the Q0 region can be expected to drop by the same amount, 35%. Experimentally this is observed in FIG. 6. The Q0 pressure with the crossed jet ICG turned off was 6.3 mTorr and when the ICG was turned on, the Q0 pressure dropped to a low of 4.5 mTorr. This was a pressure drop of 1.8/6.3*100%=29%, close to what the simulation predicts.

Figure 16:
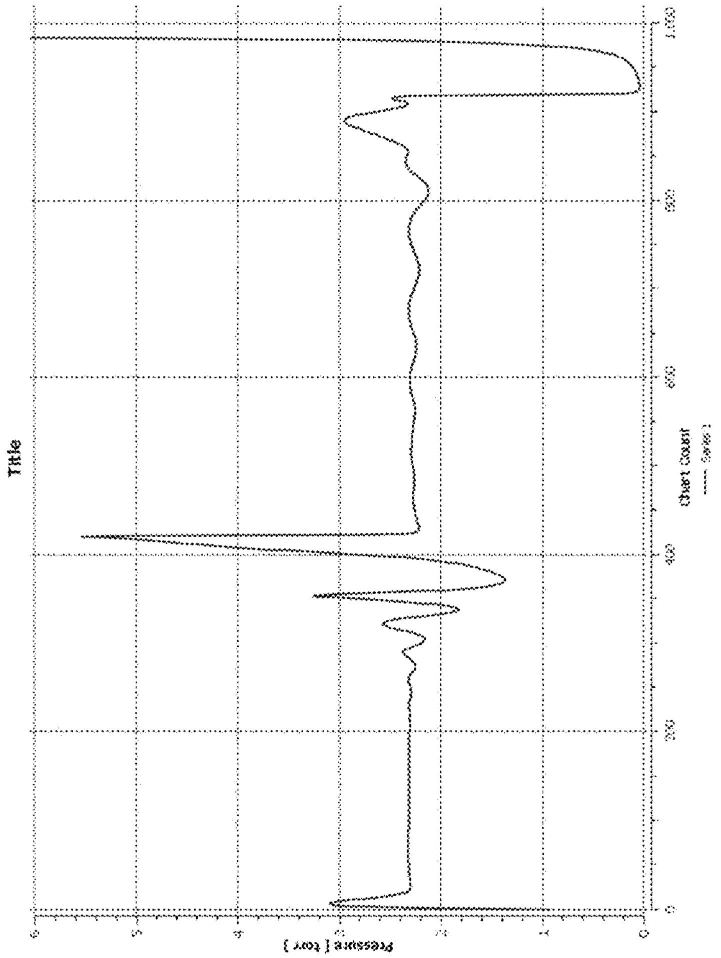
FIG. 16 is a graph showing the on-axis pressure profile for the 180 degree counter-current flow simulation of FIG. 8B.

The on axis pressure profile for the simulation shown in the top frame of FIG. 8 is shown in FIG. 16. The sampling orifice is located at the right and the IQ0 lens is located at the left. At the IQ0 aperture the impact pressure is about 3.1 Torr, which was 1.1 Torr above the simulation base pressure of 2 Torr.

Those skilled in the art will know or be able to ascertain using no more than routine experimentation, many equivalents to the embodiments and practices described herein. By way of example, the dimensions of the various components and explicit values for particular electrical signals (e.g., amplitude, frequencies, etc.) applied to the various components are merely exemplary and are not intended to limit the scope of the present teachings. Accordingly, it will be understood that the invention is not to be limited to the embodiments disclosed herein, but is to be understood from the following claims, which are to be interpreted as broadly as allowed under the law.

The section headings used herein are for organizational purposes only and are not to be construed as limiting. While the applicant's teachings are described in conjunction with various embodiments, it is not intended that the applicant's teachings be limited to such embodiments. To the contrary, the applicant's teachings encompass various alternatives, modifications, and equivalents, as will be appreciated by those of skill in the art. Those having ordinary skill in the art will appreciate that various changes can be made to the above embodiments without departing from the scope of the invention.

What is claimed is:

1. Apparatus for reducing contamination in a mass spectrometer comprising:

an ionization chamber for generating a beam of ions;

an ion guide having a plurality of rods arranged in a multipole configuration and spaced from one another to provide a channel through which an ion stream comprising ions generated in the ionization chamber can be transmitted to one or more downstream mass analyzers, the ion guide channel comprising a guide inlet aperture in communication with said ionization chamber and a guide exit aperture for passing ions to said downstream mass analyzers, a power supply for providing voltage to one or more of said plurality of rods for confining the ions within an internal volume of the ion guide channel;

a curtain gas inlet for introducing an internal curtain gas into the ion guide channel at a volumetric flow rate of at least 0.1 standard liter per minute (slpm) flowing in a contra flow direction to the ion stream, such that the internal curtain gas flow facilitates removal of neutral molecules from the ion stream.

2. The apparatus of claim 1 wherein the curtain gas inlet and ion guide channel are configured such that the internal curtain gas is directed in the contra-flow direction to ions passing through the ion guide channel.

3. The apparatus of claim 1 wherein the internal curtain gas is introduced in a direction at least orthogonal to the direction of ions passing through the ion guide channel.

4. The apparatus of claim 1 wherein the internal curtain gas is introduced in a direction from about 10 degrees to about 180 degrees contrary to the direction of ions passing through the ion guide channel.

5. The apparatus of claim 1 wherein the internal curtain gas is introduced in a direction substantially parallel but opposite to the direction of ions passing through the ion guide channel.

6. Apparatus for reducing contamination in a mass spectrometer, comprising:

an ionization chamber for generating a beam of ions;

an ion guide having a quadrupole rod set including a plurality of rods arranged in a quadrupole configuration and spaced from one another to provide a channel through which ions generated in the ionization chamber can be transmitted to one or more downstream mass analyzers, the ion guide channel comprising a guide inlet aperture in communication with said ionization chamber and a guide exit aperture for passing ions to said downstream mass analyzers, a power supply for providing voltage to one or more of said plurality of rods for confining the ions within an internal volume of the ion guide channel; and a curtain gas inlet for introducing an internal curtain gas into the ion guide channel at a volumetric flow rate of at least 0.1 standard liter per minute (slpm), such that the internal curtain gas flow facilitates removal of the neutral molecules, wherein the ion guide channel inlet aperture is configured to allow generation of a supersonic free jet expansion comprising a barrel shock of predetermined diameter downstream of the inlet aperture, and wherein a cross-section of the ion guide channel defined by a radial distance between two radially opposed rods of the quadrupole rod set is sized to be at least 50% of the predetermined diameter of the barrel shock of the supersonic jet expansion.

7. The apparatus of claim 1, further comprising an internal curtain gas supply for flowing curtain gas into the ion guide channel, where internal curtain gas flow is effective to prevent at least a portion of unwanted molecules within a sample from transiting to the ion guide channel exit aperture.

8. The apparatus of claim 7, wherein the curtain gas supply is operatively coupled to a controller adapted to adjust the volumetric flow rate of curtain gas.

9. A method for controlling contamination in a mass spectrometer system, comprising:

generating one or more ionized species from a sample within an ionization chamber;

directing an ion stream comprising ions generated in the ionization chamber through a channel of an ion guide having a plurality of rods arranged in a multipole configuration and spaced from one another to provide the channel to one or more downstream mass analyzers, the ion guide channel comprising an inlet aperture in communication with said ionization chamber and an exit aperture for passing ions to said downstream mass analyzers; and introducing an internal curtain gas into the ion guide channel at a volumetric flow rate of at least 0.1 standard liter per minute (slpm) flowing in a contra flow direction to the ion stream, such that internal curtain gas flow facilitates removal of neutral molecules from the ion stream.

10. The method of claim 9 wherein the curtain gas inlet and ion guide channel are configured such that the internal curtain gas is directed in a counter-flow direction to ions passing through the ion guide channel and into a diversion port for evacuating the internal curtain gas and neutral molecules entrained therewith.

11. The method of claim 9 wherein the internal curtain gas is introduced in a cross-flow direction at least orthogonal to the direction of ions passing through the ion guide channel.

12. The method of claim 11 wherein the internal curtain gas is introduced is a cross-flow direction from about 10 degrees to about 170 degrees counter to the direction of ions passing the ion guide channel.

13. The method of claim 9 wherein the internal curtain gas is introduced in a direct counter-flow direction substantially parallel but opposite to the direction of ions passing through the ion guide channel.

14. The method of claim 9 wherein internal curtain gas flow is effective to prevent at least a portion of unwanted molecules within a sample from transition to the ion guide channel exit aperture.

15. The method of claim 14 wherein supply of the curtain gas is controlled by a controller adapted to adjust the volumetric flow rate of the curtain gas.

16. The apparatus of claim 1 wherein said volumetric flow rate is at least 0.2 standard liter per minute (slpm).

17. The apparatus of claim 1 wherein said internal curtain gas is introduced into said ion guide at a pressure greater than about 1 Torr.

18. The apparatus of claim 1 further comprising a declustering region positioned between said ionization chamber and said ion guide.

19. The apparatus of claim 1, further comprising:

a gas curtain chamber disposed between said ionization chamber and said ion guide, a first gas source for providing a curtain gas flow into said gas curtain chamber, a second gas source for providing said internal curtain gas into said ion guide channel.

20. The apparatus of claim 19, wherein said first and second gas sources are independently controlled.

21. The apparatus of claim 1, wherein said ionization chamber comprises a curtain plate defining a curtain plate aperture through which the ion stream can pass, wherein the ion guide defines a longitudinal axis, and wherein the apparatus further comprises another ion guide, positioned downstream of the ion guide and upstream of the one or more mass analyzers, receiving ions exiting the ion guide, said other ion guide comprising another plurality of rods arranged in a quadrupole configuration and spaced from one another for radially focusing the received ions.

22. The apparatus of claim 1, further comprising a vacuum chamber comprising the ion guide and located downstream of the ionization chamber, the ion guide maintained at a pressure of between 1 Torr to 7.5 Torr, wherein the ion guide is configured to capture and focus ions using a combination of gas dynamics and radio frequency fields.

23. The apparatus of claim 1, wherein the internal curtain gas is introduced into the ion guide channel at a volumetric flow rate of between 0.1 slpm and 1 slpm.

* * * * *